United States Patent
Dominke et al.

(10) Patent No.: US 6,871,127 B2
(45) Date of Patent: Mar. 22, 2005

(54) METHOD FOR CONTROLLING A STEER-BY-WIRE SYSTEM

(75) Inventors: Peter Dominke, Bietigheim-Bissingen (DE); Chi-Thuan Cao, Korntal-Muenchingen (DE); Wolfgang Pfeiffer, Grossbottwar (DE); Bo Yuan, Ditzingen (DE); Klaus-Dieter Leimbach, Eschach (DE); Bernd Mueller, Leonberg (DE); Werner Harter, Illingen (DE); Peter Blessing, Heilbronn (DE); Juergen Schuele, Schwäbisch Gmünd (DE); Herbert Lohner, Friolzheim (DE)

(73) Assignees: Robert Bosch GmbH, Stuttgart (DE); ZF Lenksysteme GmbH, Schwabisch (DE)

(*) Notice: Subject to any disclaimer, the term of this patent is extended or adjusted under 35 U.S.C. 154(b) by 29 days.

(21) Appl. No.: 10/168,897
(22) PCT Filed: Sep. 29, 2001
(86) PCT No.: PCT/DE01/03752
§ 371 (c)(1), (2), (4) Date: Oct. 24, 2002
(87) PCT Pub. No.: WO02/32742
PCT Pub. Date: Apr. 25, 2002

(65) Prior Publication Data
US 2003/0114969 A1 Jun. 19, 2003

(30) Foreign Application Priority Data
Oct. 21, 2000 (DE) .......................................... 100 52 343

(51) Int. Cl.$^7$ ................................................. B62D 6/00
(52) U.S. Cl. ......................................... 701/43; 180/422
(58) Field of Search ............... 701/41–43; 180/402–405, 180/407, 421, 422, 443; 318/543, 546, 564

(56) References Cited

U.S. PATENT DOCUMENTS 6,213,246 B1 * 4/2001 Bohner et al. ............... 180/403
6,285,936 B1 * 9/2001 Bohner et al. ................. 701/41

FOREIGN PATENT DOCUMENTS

| DE | 195 40 956 | 3/1997 |
| DE | 198 01 393 | 7/1999 |
| DE | 198 38 490 | 12/1999 |
| DE | 198 41 101 | 3/2000 |
| DE | 198 42 627 | 4/2000 |
| DE | 199 12 169 | 7/2000 |

* cited by examiner

Primary Examiner—Thu V. Nguyen
(74) Attorney, Agent, or Firm—Kenyon & Kenyon

(57) ABSTRACT

A device for controlling a steer-by-wire steering system in a vehicle, in which redundantly generated sensor signals for regulating a steering motor and for a feedback actuator that transfers the restoring torques from the road to the driver via the steering wheel are received by a control device and plausibility checks of the sensor signals are performed therein and in an operatively associated monitoring module. Microcomputer module and monitoring module monitor each other reciprocally. An auxiliary level for the SbW steering system is monitored by the control device which, in the case of error, switches to this auxiliary level or a mechanical auxiliary level. To further increase safety, the steering wheel motor is triggered via control signals for its phase currents and by a steering wheel motor enable signal, and the steering motor is triggered via control signals for its phase currents and via a steering motor enable signal.

25 Claims, 13 Drawing Sheets

METHOD FOR CONTROLLING A STEER-BY-WIRE SYSTEM

FIELD OF THE INVENTION

The present invention relates to a method of controlling a steer-by-wire steering system, and a steer-by-wire steering system for vehicles, having an electronically regulated steering actuator that is attached either to the steering gear of the front axle or to both steerable front wheels, a steering wheel angle sensor that measures the driver's steering command at the steering wheel, a feedback actuator unit that provides feedback from the road to the driver through the steering wheel, a steer angle sensor for acquiring the current steering angle at the steering gear on the front axle or on the two front wheels, and a control device for acquisition of the signals transmitted by the sensors and calculation of trigger signals for the steering actuator and the feedback actuator unit.

BACKGROUND INFORMATION

A steer-by-wire steering system is discussed in German Patent No. 195 40 956. In this steering system, the mechanical connection between the steering wheel and a steering gear acting on the steered wheels may be interrupted by opening a coupling. This steering system then becomes a steer-by-wire steering system, in which the steering wheel is only indirectly coupled to the steering gear arrangement. In this known steer-by-wire steering system, feedback from the road to the driver is assured via the steering wheel by the provision of a feedback actuator unit that is realized as a non-self-locking electric motor and provides controllable operating resistance that is triggered by a control device on the steering wheel.

Unless appropriate precautions are implemented, a fault in a steer-by-wire steering system may lead directly to danger to life and limb of the driver. Accordingly, a requirement arose to ensure that no single error of the steer-by-wire steering system can possibly result in its failure.

SUMMARY OF THE INVENTION

An exemplary embodiment of the present invention provides a method of operating a steer-by-wire steering system, and a steer-by-wire steering system, that may realize all steer-by-wire functions, including the functions for the feedback actuator, with a high degree of safety. In general, a steer-by-wire steering system according to an exemplary embodiment of the present invention should guarantee a degree of safety that equals if not surpasses that assured by conventional power steering.

A high degree of protection against malfunctions is assured by redundancy in the acquisition of measured values, control of the steering actuator and the feedback actuator, checking of all functions and components, and communications.

Particularly the discrete means of acquiring various measured variables, including steering wheel angle, steering angle, restoring moment, make it easier to carry out a plausibility check of the different measured values, and to detect the occurrence of any erroneous VALUES. This increases the reliability and failsafe nature of a steer-by-wire steering system functioning according to the present invention.

Safety is further improved by redundant communication within the control device and with the vehicle's other control devices or sensors, as well as by the fact that switching from steer-by-wire operation to the auxiliary level only takes place after a transition period has elapsed following the occurrence of an error. This latter measure assures that all functions of the steer-by-wire steering system are in a defined state at the times the switch to the auxiliary level is effected.

The reliability of a steer-by-wire steering method functioning according to an exemplary embodiment of the present invention is further increased by the division of the functions within the control device into four logic levels. This division of the functions and the reciprocal checking enable any errors and malfunctions to be detected with a high degree of safety, and the steer-by-wire steering system is able to respond accordingly.

With reference to the separate monitoring module, the control device has two hardware levels and four logic levels. In the hardware levels, the microcomputer or microcomputers and the monitoring module work together. The monitoring module communicates with the microcomputer or microcomputers via an internal bus system. In this way, the computing capacity of the microcomputer or microcomputers is checked and the program executions in the computer or computers are monitored. The selected means of data communication between the microcomputer or microcomputers and the monitoring module enables reciprocal monitoring of these components.

BRIEF DESCRIPTION OF THE DRAWINGS

FIG. 1a shows a steer-by-wire steering system having a mechanical auxiliary level.

DETAILED DESCRIPTION

The structure and basic functional operation of a steer-by-wire steering system having a hydraulic or mechanical auxiliary level will be described with reference to FIGS. 1 to 4. A steer-by-wire steering system having a hydraulic auxiliary level is the object of German Published Patent Application No. 198 38 490.

Figure 1:
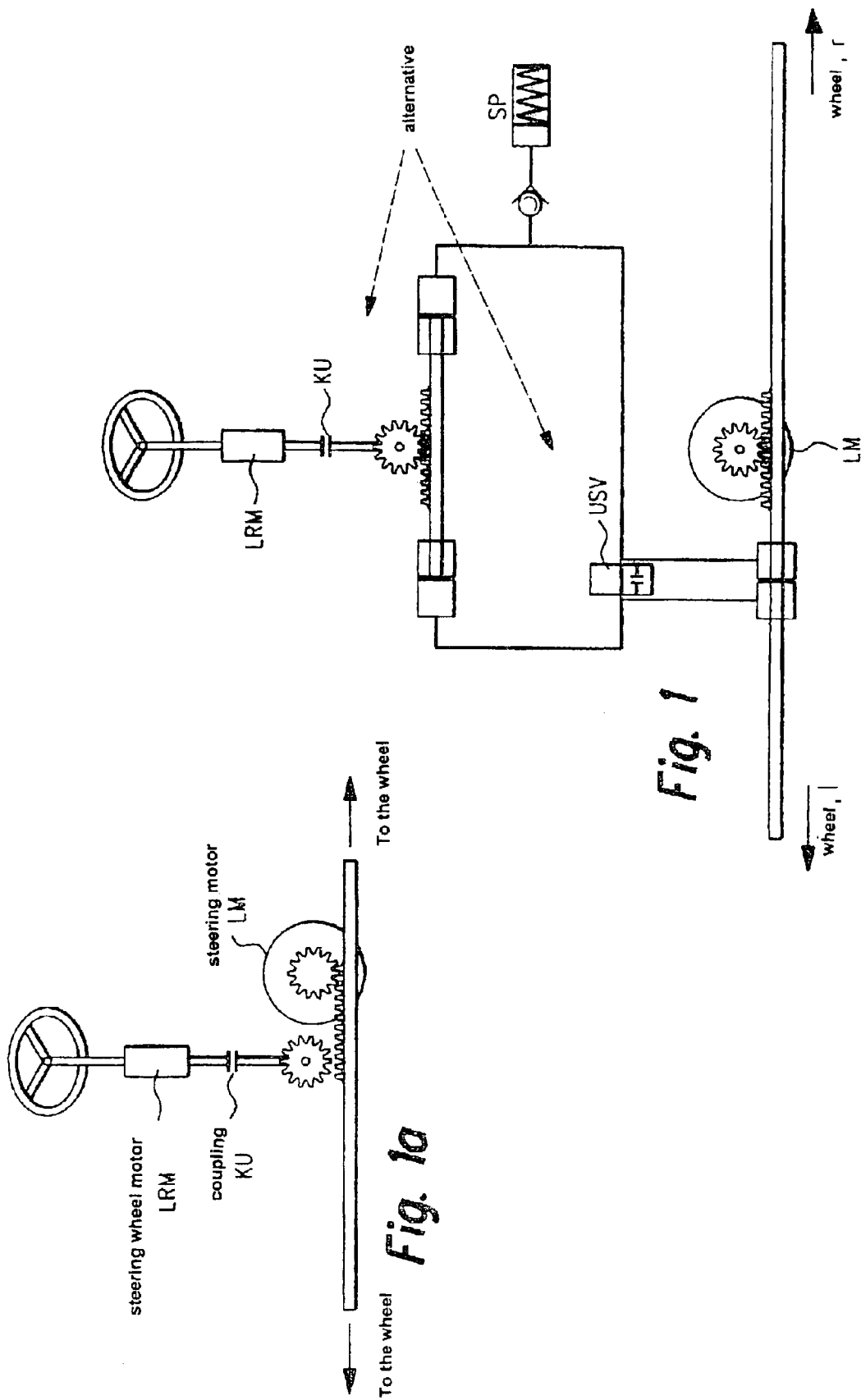
FIG. 1 shows a schematic diagram of a steer-by-wire steering system having a hydraulic auxiliary level and an electromotive steering actuator.
Figure 2:
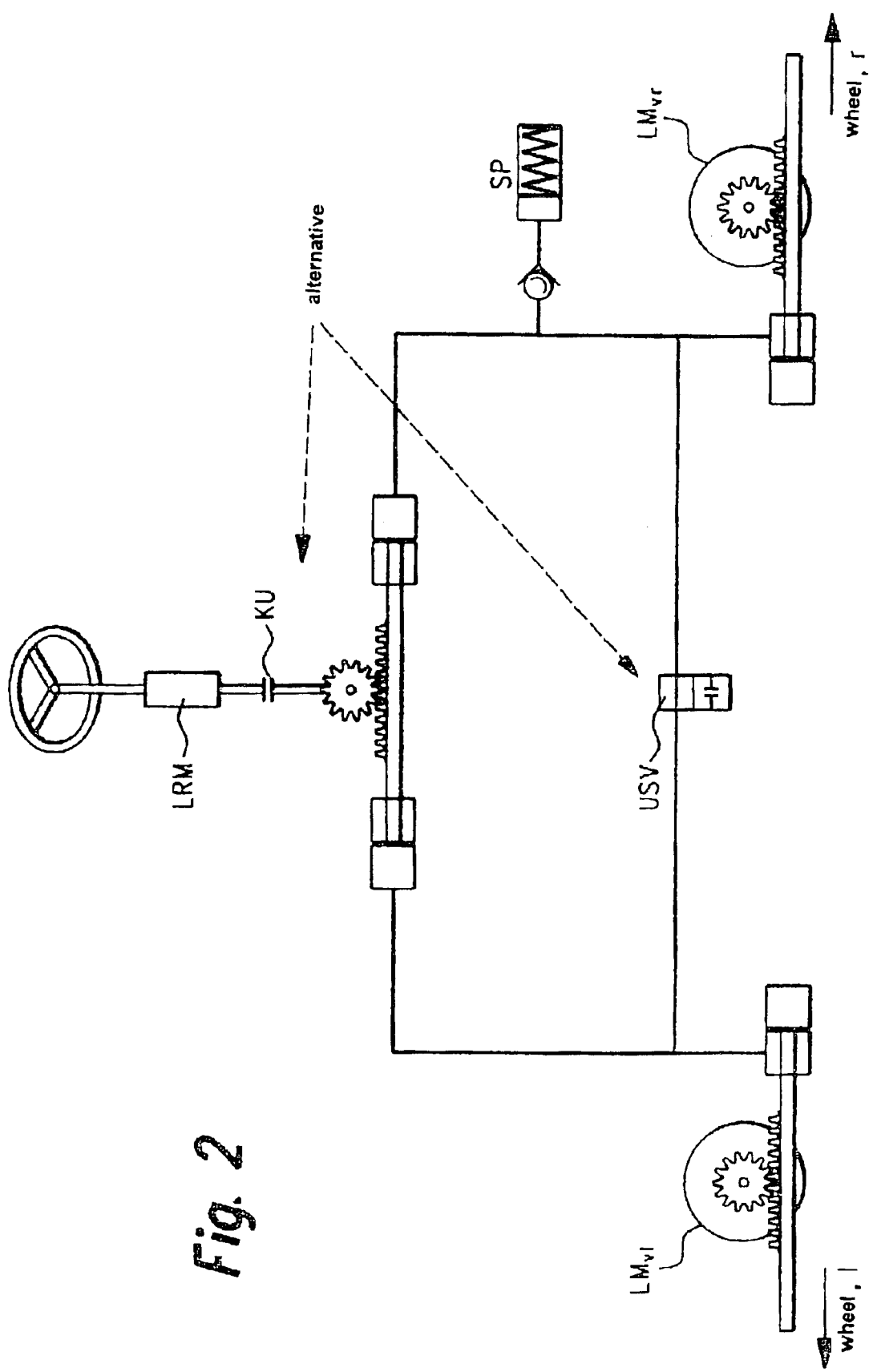
FIG. 2 shows a schematic diagram of a steer-by-wire steering system having a hydraulic auxiliary level and two electromotive steering actuators.

The structure shown in FIG. 1 differs from that shown in FIG. 2 in that in steer-by-wire operation with the steer-by-wire steering system of FIG. 1, the steered wheels are moved by one steering motor LM, whereas FIG. 2 shows a variant in which two steering motors $LM_{v,l}$ and $L_{v,r}$ are used.

In FIGS. 1 and 2 a steering wheel motor LRM is shown, which acts as the feedback actuator for the restoring forces to be transferred to the driver through the steering wheel.

The hydraulic auxiliary level is provided by symmetrical hydraulic cylinders, a pressure reservoir SP for hydraulic fluid, and optionally a coupling KU between steering wheel motor LRM and the mechanical action of the steering column on the two hydraulic cylinders on the steering wheel side or a switchover valve USV that short circuits the hydraulic cylinder or cylinders on the steering gear side in steer-by-wire operation, these hydraulic components being interconnected by means of hydraulic lines.

In the variant shown in FIG. 2, having steering motors $LM_{v,l}$ and $L_{v,r}$ on the left and right side, respectively, in contrast to FIG. 1, two individual hydraulic cylinders are provided for the hydraulic auxiliary level instead of a single dual cylinder on the steering gear side, and switchover valve USV is located in a bypass line between the two hydraulics cylinders on the steering gear side that are connected by a hydraulic line.

An exemplary embodiment of a steer-by-wire steering system having a mechanical auxiliary level is shown in FIG. 1a, The mechanical auxiliary level has a split steering column and a coupling KU in the steering column. In steer-by-wire operation, coupling KU is open so that the mechanical engagement between the steering wheel and rack of the steering linkage is interrupted. A steering movement is made by steering motor LM through the insertion of a steering gear and a steering linkage.

In the event of a failure, coupling KU is closed so that the steering wheel engages directly with the rack of the steering linkage. Coupling KU is closed when the control device is without voltage.

Instead of the embodiment variants shown in FIGS. 1, 1a and 2, which all show direct positional intervention of steering motor LM, steering motor LM could also assure the adjustment of the hydraulic flow to the steering torque booster by means of the rotary slide valve of a hydraulic power steering system.

Figure 3:
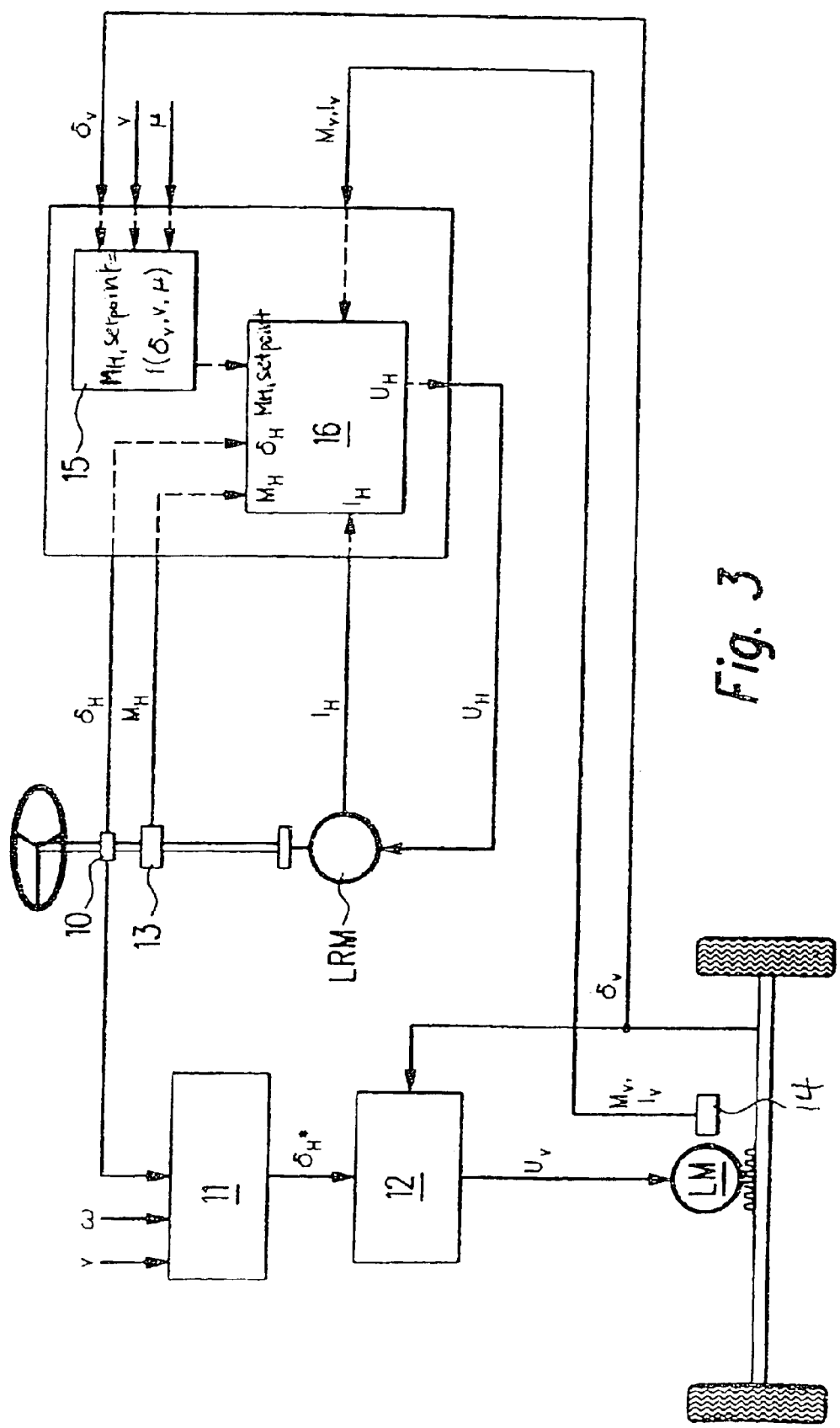
FIG. 3 shows a functional diagram of a steer-by-wire steering system having a steering actuator.
Figure 4:
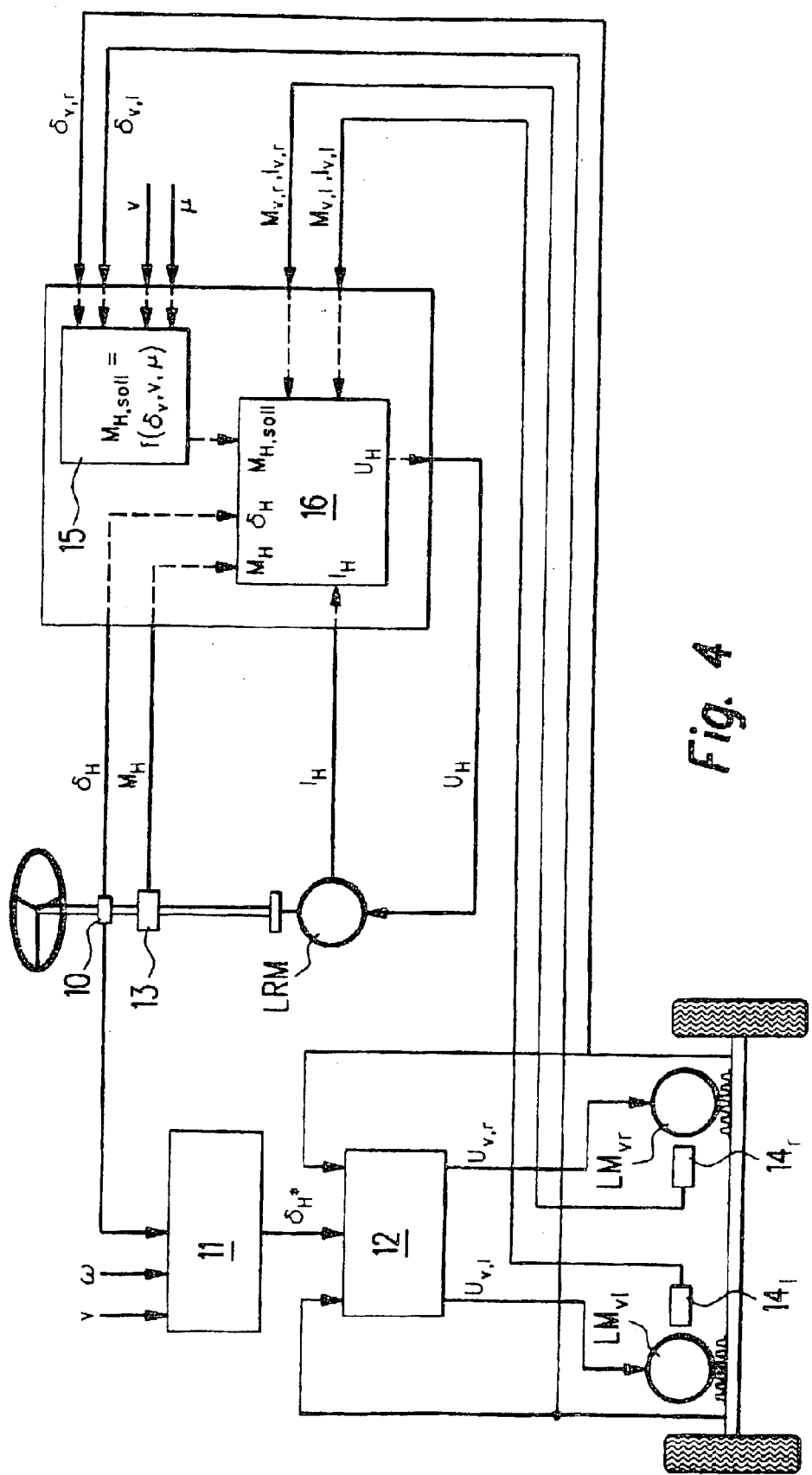
FIG. 4 shows a functional diagram of a steer-by-wire steering system having two steering actuators.

FIGS. 3 and 4 show the basic control and regulation structure of a steer-by-wire steering system in the form of functional blocks.

The steering wheel angle $\delta_H$ selected by the driver is acquired by a steering wheel angle sensor 10. Steering wheel angle $\delta_H$ is modified through a setpoint value generation 11 depending on the situation and on the basis of dynamic driving variables, such as speed ω, yaw rate ω, to provide a modified steering wheel angle $\delta_{H^*}$, which in turn serves as the setpoint value for a steering regulator 12.

Steering regulator 12 generates a manipulated variable for steering motor LM, which is applied to steering motor LM in the form of a voltage $U_v$.

Alternatively, as shown in FIGS. 2 and 4, where a steering motor ($LM_{v,l}$, $LM_{v,r}$) is provided for each front wheel, steering regulator 12 generates voltage $U_{v,l}$ as an actuating signal for left steering motor $LM_{v,l}$ and $U_{v,r}$ as an actuating signal for right steering motor $LM_{v,r}$. In this case, the front wheels may be steered individually, and, in principle, independently of each other. In FIG. 3, the steering regulator receives sensor-measured steering angle $\delta_v$ for both front wheels, and in FIG., 4 sensor-measured steering angles $\delta_{v,l}$ and $\delta_{v,r}$ are transmitted separately for the right and left front wheels, respectively.

The feedback from the road surface on the steered wheels, which heavily influences driver's steering command $\delta_H$, may be measured, for example, with a restoring torque sensor 14 as restoring torque $M_v$, or as restoring torques $M_{v,l}$ and $M_{v,r}$ at both wheels. In order for this feedback to be sent to the driver as well, a feedback actuator is provided, which exerts a torque corresponding to the feedback on the steering column and thus also on the steering wheel of the vehicle. This torque, which hereafter will be termed hand torque $M_H$, may be measured by a hand torque sensor 13 on the steering column.

The feedback actuator of the vehicle equipped with steer-by-wire steering system includes electric steering wheel motor LRM, which is connected to the steering wheel via a gear system (not shown), and is regulated as shown in FIGS. 3 and 4 by a steering wheel regulator 16. To this end, steering wheel regulator 16 calculates a setpoint hand torque $M_{H,setpoint}$ either on the basis of restoring torque $M_v$ as measured by a restoring torque sensor 14, or on the basis of currents ($I_v$, $I_{v,l}$, $I_{v,r}$) at steering motors LM, $LM_{v,l}$ $LM_{v,r}$).

In the following the terms "steering regulator" and "steering motor" as well as "feedback actuator" and "steering wheel motor" will be used synonymously.

Alternatively, steering wheel regulator 16 may also use a feedback simulator 15 to simulate setpoint hand torque $M_{H,setpoint}$ from the sensor-measured steering angles $\delta_v$ (or $\delta_{v,l}$ and $\delta_{v,r}$) and other signals present in the vehicle, such as driving speed v and the coefficient of friction $\mu$ between the street and tires. Steering wheel regulator 16 triggers steering wheel motor LRM using manipulated value $U_H$ according to setpoint hand torque $M_{H,setpoint}$ such that hand torque $M_H$ measured by the hand torque sensor 13 corresponds to setpoint hand torque $M_{H,setpoint}$.

In FIGS. 5 to 8, the structure and function of four embodiment variants of control devices according to the present invention are shown.

Figure 5:
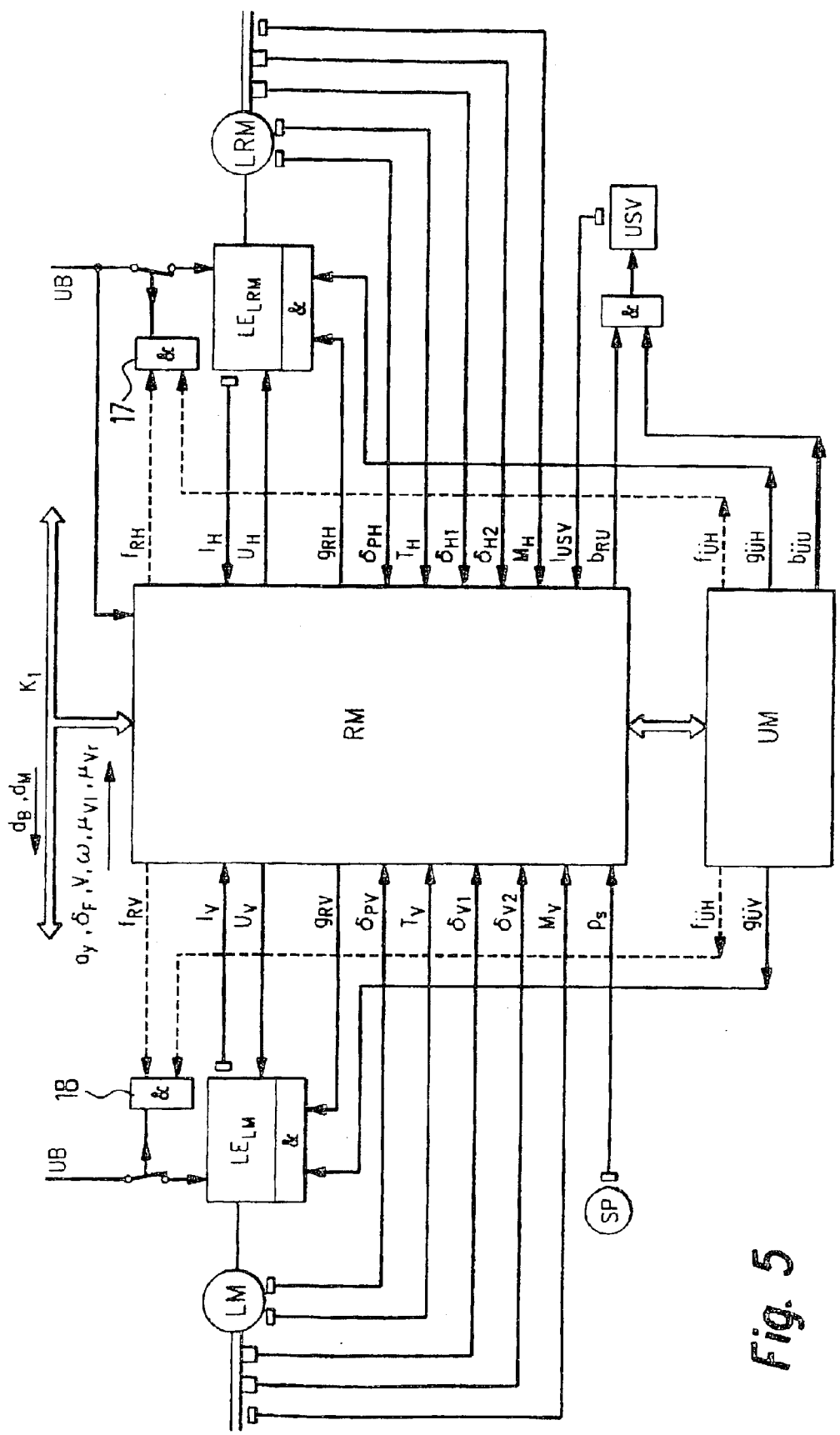
FIG. 5 shows the structure of a control device that may be used with the present invention, having a microcomputer and a separate monitoring module.

FIG. 5 shows an embodiment variant of a control device having a single microcomputer system in a block diagram. The microcomputer system includes a microcomputer RM and the associated peripheral components for the acquisition of all sensor signals. Moreover, the system also contains the necessary processing functions for forming the trigger signals for power electronics components $LE_{LM}$, $LE_{LRM}$ for generating trigger signals $U_H$ for steering wheel motor LRM and $U_v$ (or $U_{v,l}$ and $U_{v,r}$) for steering motor LM (or steering motors $LM_{v,l}$ and $LM_{v,r}$). $K_1$ indicates a communication system that is implemented, for example, through a serial bus such as a CAN bus, and that provides the link to other control devices in the motor vehicle or also to a diagnostic system for the error information. $K_1$ may be unique or redundant.

Monitoring module ÜM within the control device serves to monitor the error-free operation of the steer-by-wire functions of microcomputer RM and the associated peripheral components, and may be implemented, for example, as a microprocessor or ASIC.

The following functions are implemented in microcomputer RM:
  sensor signal acquisition and calculation of trigger signals $U_H$ for regulating steering wheel motor LRM;
  sensor signal acquisition and calculation of trigger signals $U_v$ for regulating steering motor LM;

monitoring of the auxiliary level;

interface to communication system $K_1$.

A detailed description of these subfunctions is presented in the following sections A through H.

A: Sensor signal acquisition and calculation of trigger signals for regulating the steering wheel motor For triggering steering wheel motor LRM, the following signals are acquired through peripheral components of microcomputer system RM.

steering wheel angles $\delta_{H1}$ and $\delta_{H2}$;

motor torque $M_H$ of steering wheel motor LRM. In a further variant, the motor torque is determined using the measured motor currents;

rotor position $\delta_{PH}$ of steering wheel motor LRM; for example, when using a BLDC, asynchronous or switched reluctance motor;

actual values of phase currents $I_H$ of steering wheel motor LRM;

temperature $T_H$ of steering wheel motor LRM, in an alternative configuration, signal $T_H$ indicates the temperature of the output stages within power electronics $LE_{LRM}$ for steering wheel motor LRM, or includes both temperatures;

terminal voltage of the vehicle electrical system UB.

Trigger signal $U_H$ serves primarily to trigger the power electronics $LE_{LRM}$. This trigger signal is a manipulated variable of a digital regulator and may be output, for example, as a pulse width modulated (PWM) signal. Manipulated variable $U_H$ is calculated from the measured motor torque $M_v$ of steering motor LM, the rotor position $\delta_{PH}$ of steering wheel motor LRM and other parameters that characterize the status of the vehicle or the road surface. Steering wheel motor LRM is triggered by power electronics $LE_{LRM}$ upon enabling through enable signals $g_{RH}$ and $g_{\ddot{U}H}$. A first motor relay 17 connected upstream of the power electronics is triggered by signals $f_{RH}$ and $f_{\ddot{U}H}$.

B: Sensor signal acquisition and calculation of trigger signals for regulating the steering motor For triggering steering wheel motor LRM, the following signals are acquired through peripheral components of microcomputer system RM.

steering wheel angles $\delta_{H1}$ and $\delta_{H2}$;

motor torque $M_H$ of steering wheel motor LRM. In a further variant, the motor torque is determined using the measured motor currents;

rotor position $\delta_{PH}$ of steering wheel motor LRM; for example, when using a BrushLess DC motor (BLDC), asynchronous or switched reluctance motor;

actual values of phase currents $I_H$ of steering wheel motor LRM;

temperature $T_H$ of steering wheel motor LRM, in an alternative configuration, signal $T_H$ indicates the temperature of the output stages within power electronics $LE_{LRM}$ for steering wheel motor LRM, or includes both temperatures;

terminal voltage of the vehicle electrical system UB.

For regulating the desired steering angle $\delta_v$, the representative value is first formed from measured variables $\delta_{v1}$ and $\delta_{v2}$, e.g., by calculation of an average with the fully functional angle sensors. In the formation of the setpoint value, the reference variable of the regulator is formed from a representative value of measured steering wheel angles $\delta_{H1}$ and $\delta_H$ and the current steering transfer ratio. With steering interventions by a dynamic driving system, the reference variable for the steering angle is calculated with the additional application of the vehicle's yaw rate $\omega$ and transverse acceleration $a_y$, or an angle transmitted via communication system $K_1$, or a differential angle $\delta_F$ is used. If the control device structure is used to provide a tracking system, angle $\delta_F$ could also represent the reference variable for the steering angle intervention that is calculated and preset by a higher-level control system.

Power electronics $LE_{LM}$ of steering motor LM are triggered primarily by trigger signal $U_v$. This trigger signal is a manipulated variable of a digital regulator and may be output, for example, as a PWM signal. In this case, the currently available voltage status of the vehicle electrical system UB must be taken into account. Steering motor LM is triggered via power electronics $LE_{LM}$, if enable signals $g_{RV}$ and $g_{\ddot{u}V}$ are set. A second motor relay 18 connected upstream of the power electronics is triggered by signals, $f_{RV}$ and $f_{\ddot{u}V}$.

C: Monitoring of the auxiliary level and switching to the auxiliary level

An essential parameter for the availability of the auxiliary level of the steer-by-wire steering system is the pressure ps in the hydraulics unit. This pressure ps is measured either continuously at pressure reservoir SP or at specified intervals and transmitted to microcomputer RM in the form of an analog signal $p_s$, In normal operation, switchover valve USV is triggered by signals $b_{RU}$ and $b_{\ddot{u}U}$ from monitoring module ÜM. If one of these trigger signals is missing, switchover valve USV switches to the hydraulic auxiliary level. This means that if the vehicle electrical system fails, operation at the auxiliary level is assured automatically. In the event of a significant error, trigger signal $b_{RU}$ is removed by the steer-by-wire steering system, or signal $b_{\ddot{u}U}$ is removed by the monitoring module, and operation is switched to the auxiliary level.

D: Interface to other control devices and display units

The sensor signals for yaw rate $\omega$ and for transverse acceleration $a_y$ are transmitted to the microcomputer system via communication system $K_1$. In addition, estimated values for friction coefficients $\mu_{vl}$ and $\mu_{vr}$ between the left wheel and the street as well as between the right wheel and the street, and an estimated value of the vehicle speed v are also transferred via $K_1$. Moreover, this communication system may be used to specify a reference variable $\delta_F$ for the wheel steering angle in the event of a dynamic intervention via the steering system or with a tracking system.

Signals $d_B$ may also be transmitted via this communication system to an information system that informs the driver of possible error conditions in the system or, for example, informs the driver of a switch to the hydraulic auxiliary level. Signals $d_m$ are sent to other control devices, which e.g., cause the vehicle to slow down when the switch is made to the hydraulic auxiliary level.

E: Safety measures in the control device

In order to satisfy safety requirements imposed on a steer-by-wire steering system, all simple system errors occurring within the system must be recognized within a system-typical fault tolerance interval. After detecting a significant error, the Steering-by-Wire (SbW) steering system is first switched to the auxiliary level operating mode within a transition time (e.g., within 5 seconds). In this mode, higher-level system control functions are no longer executed, i.e., dynamic steering intervention, steering intervention for crosswind compensation or intervention into the steering system, which change the transfer ratio between the steering wheel angle and the steering angle are terminated definitively. When the transition interval has elapsed or after all higher-level steering functions have been terminated, or if a second significant error occurs during the transition time, the control of coupling KU (see FIGS. 1, 1a and 2) in the steering column is terminated and consequently the auxiliary level is activated. To this end, the following measures are provided:

- redundant acquisition of steering wheel angle ($\delta_{H1}$, $\delta_{H2}$);
- redundant acquisition of steering angle $\delta$hd vor the steering angle on the front axle, ($\delta_{v1}$, $\delta_{v2}$);
- triggering of steering wheel motor (LRM) via control signals UH for the phase currents and enable signal $g_{RH}$;
- redundant cut-off path for steering wheel motor LRM and also for steering motor LM via assigned motor relays (not with switched reluctance motors);
- monitoring of sensor signals using plausibility checks and analytical redundancy;
- monitoring of microcomputer module RM via monitoring module ÜM and vice versa F: Monitoring concept of the control device The monitoring concept of the control device is structured in four logical levels $L_1$, $L_2$, $L_3$, and $L_4$ and two hardware levels RM and ÜM Monitoring module ÜM communicates with microcomputer module RM by means of an internal bus system. This serves to check the computing capacity of this microcomputer system and to monitor the programs running in the computer. These components are monitored reciprocally by the selected data communication type between microcomputer module RM and monitoring module ÜM. For this, the following functions are assigned to the logical levels:

Level $L_1$

Level $L_1$ is implemented in microcomputer RM. It has the following tasks:

- plausibility checks on input signals;
- selection of the steering wheel angles and steering angles needed for processing from the redundant sensor signals in each case;
- calculation of the regulating functions for trigger of steering wheel motor (LRM) and steering motor (LM);
- alteration of the triggering of switchover valve USV in the event of failure to switch over to the hydraulic auxiliary level.

Level $L_2$

Level $L_2$ is incorporated into microcomputer RM. This level is responsible for checking the correctness of the calculations performed in level $L_1$ using algorithms that differ from those used in level $L_1$. In order to perform the calculations, the redundant input data stored in the memory cells are used, thus allowing errors due to corrupted memory content to be detected. For checking the regulator functions, simple regulating algorithms are run in parallel, which are calculated with the redundant data stored for the reference variables and the current actual values of the regulating variables. An error condition is recognized on the basis of significant deviations between these simplified manipulated variable calculations and the calculations run at level $L_1$. The correct function of both controlled systems is also checked in level 2. For this, a mathematical model of the controlled system is provided for each case, describing the dynamic relationships between the manipulated variables and the regulating variables, also taking into account interference variables. The manipulated variables calculated in the regulating algorithms in level $L_1$ are added to these models. An error condition is recognized in the event of significant deviations between the model output variables and the associated measured actual values of the regulating variables.

If an error is recognized by microcomputer module RM in level $L_2$ and also in level $L_3$, the associated enable signals $g_{RV}$ or $g_{RH}$ for triggering the respective power electronics $LE_{LM}$ and $LE_{LRM}$ of steering motor LM and steering wheel motor LRM are reset.

Level $L_3$

This level is implemented in microcomputer module RM. In order to guarantee the reliable functioning of the steer-by-wire steering system in the event of a computer or software error, in the event of an error the programs in level $L_1$ and $L_2$ must still execute properly or their improper execution must be reliably detected. This control check is performed in the variant shown by a question session between levels $L_3$ and $L_4$. Microcomputer system RM retrieves an interrogation from monitoring module ÜM, and responds, in each case taking into consideration all safety-relevant routines within a predetermined time interval in each case. A question is only able to be answered correctly if fault-free execution of the computer programs for the computer function test and the command test is assured. The partial answers constructed from the subroutines are concatenated into a full answer and passed to level $L_4$ in monitoring module ÜM.

Level $L_4$

This level is implemented in monitoring module ÜM. Here the full answer provided by microcomputer RM is checked with respect to the time interval of its arrival and for an exact bit match with the correct answer to the question. If the interrogation communication is not executed without error in level $L_3$, enable signals $g_{\ddot{u}V}$ and $g_{\ddot{u}H}$ for triggering the motors, enable signals $f_V$ and $f_{OH}$ for triggering the motor relays, and trigger signal $b_{\ddot{u}u}$ for the switchover valve are reset.

G. Measures for the sensor monitoring

Angle sensor values, ($\delta_{H1}$, $\delta_{H2}$) on the steering wheel are checked against each other for plausibility. Moreover, the measured value of the torque sensor may also be used to check these measured values, taking into account the mechanical inertias of the steering wheel and a mathematical model for rotational movement as well as the current friction values. If a BLDC, asynchronous, or a switched reluctance motor is used as steering wheel motor LRM, a position sensor with an angle range from 0° to 360° must be used to regulate the phase currents, This sensor information may also be used for checking the measured steering wheel angles, or in a simplified variant, an angle sensor with lower resolution may be used in conjunction with this position measurement.

The torque measured value at the steering wheel may be monitored taking into account the measured phase currents and the temperature variable essential for monitoring the motor using a mathematical plausibility model.

Angle sensor values ($\delta_{v1}$, $\delta_{v2}$) at steering motor LM are checked against each other for plausibility. In addition, the measured values of the steering wheel angle ($\delta_{H1}$, $\delta_{H2}$) may be used for locating the faulty sensor in the event of deviations between sensor values $\delta_{v1}$, and $\delta_{v2}$. This is done by including in the calculation the current steering transfer ratio and taking into account any dynamic steering interventions that occur. This trouble-shooting measure may also be used in the opposite direction to detect a faulty steering wheel sensor. If an asynchronous machine or a switched reluctance motor is used as steering motor LM, a position sensor having an angle range from 0 to 360° must be used to regulate the phase currents. This sensor information may also be used for checking the measured steering angles, or in a simplified variant, an angle sensor with lower resolution may be used in conjunction with this position measurement. The torque measured value at the steering wheel may be monitored taking into account the measured phase currents and the measured temperature variable essential for monitoring the motor using a mathematical plausibility model.

Before beginning a journey, the entire function chain of the steer-by-wire control device may be tested by the injection of a defined setpoint torque at the steering wheel motor.

H: Special features of the various configuration variants of the control device

Figure 6:
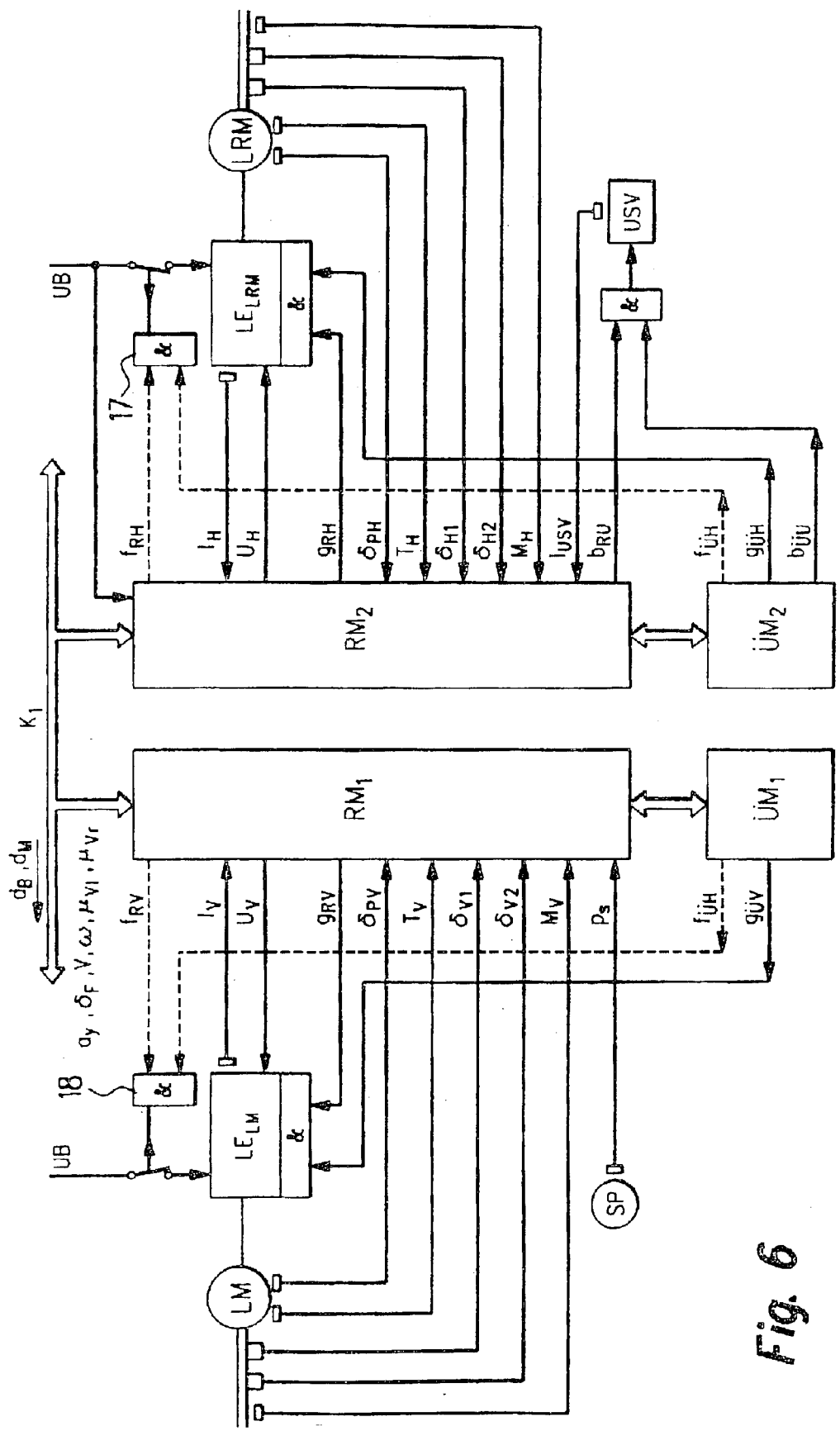
FIG. 6 shows a control device structure having two microcomputers, each having a separate monitoring module.

In the configuration variant shown in FIG. 6, the functions described in the foregoing are divided between two microcomputers $RM_1$ and $RM_2$. Microcomputer $RM_1$ is tasked with the regulating and monitoring functions for steering motor LM and monitoring the pressure in the hydraulic auxiliary level. Microcomputer $RM_2$ is responsible for regulating feedback actuator for the steering wheel and triggering the auxiliary level. Both components may exchange data with each other and with other computer systems via the communication system $K_1$, or even communicate directly with each other via a path not shown in FIG. 6. The functionalities of the two computer systems $RM_1$ and $RM_2$ are checked in accordance with the points listed in section F (structure of monitoring) via separate monitoring modules $\ddot{U}M_1$ and $\ddot{U}M_2$.

Figure 7:
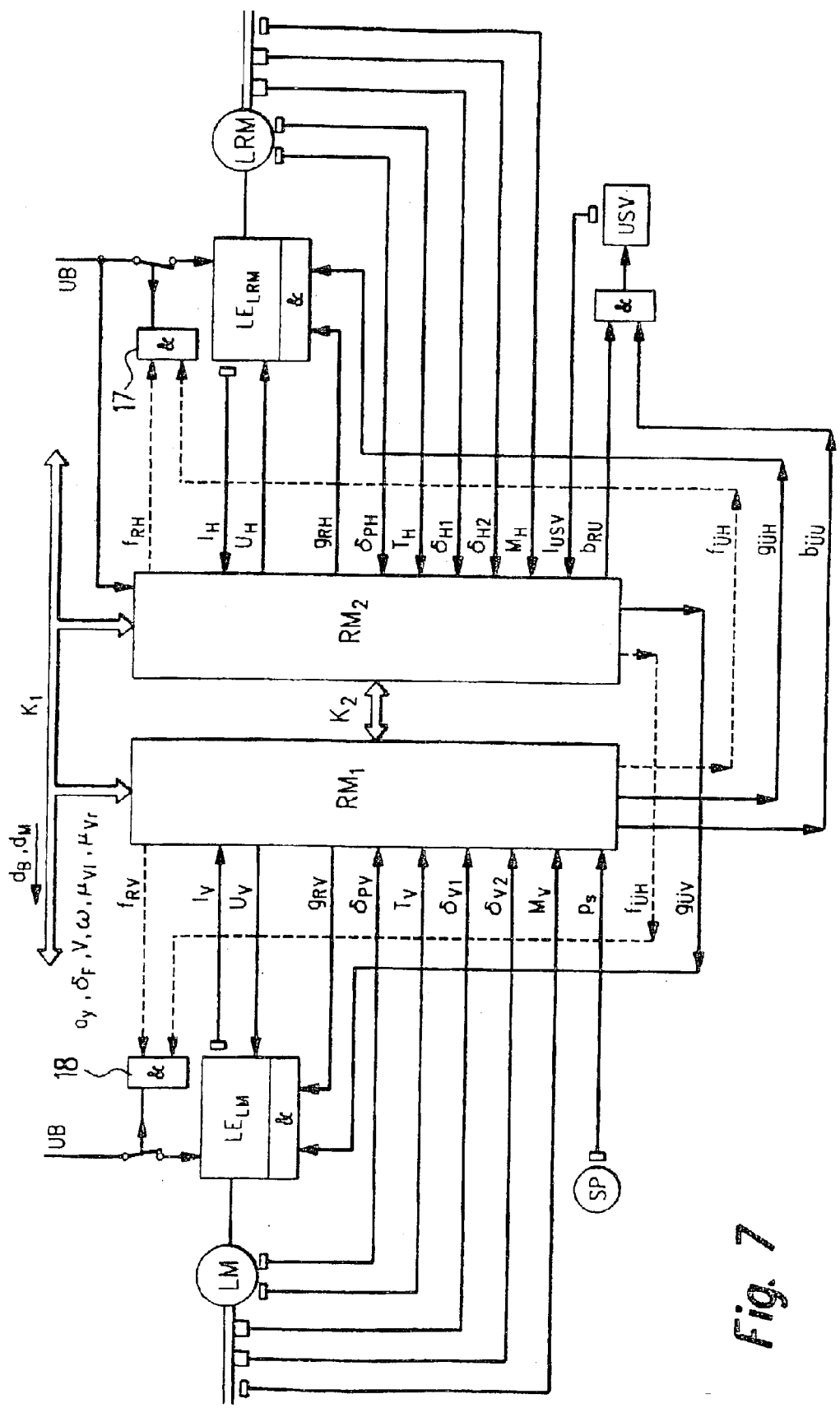
FIG. 7 shows the structure of a control device having two microcomputers, which themselves contain the monitoring means.

In the variant according to FIG. 7, the division of functions of the control device takes place again between two microcomputer systems $RM_2$, $RM_2$ corresponding to the embodiment variant according to FIG. 6. A second communication system $K_2$ allows direct communication between both microcomputer systems $RM_1$, $RM_2$.

The functions described in section F (structure of monitoring) at the level of the monitoring component are now taken over by the respectively adjacent computing unit, that is to say, $RM_1$ takes over the monitoring of component $RM_2$ and vice versa.

Figure 8:
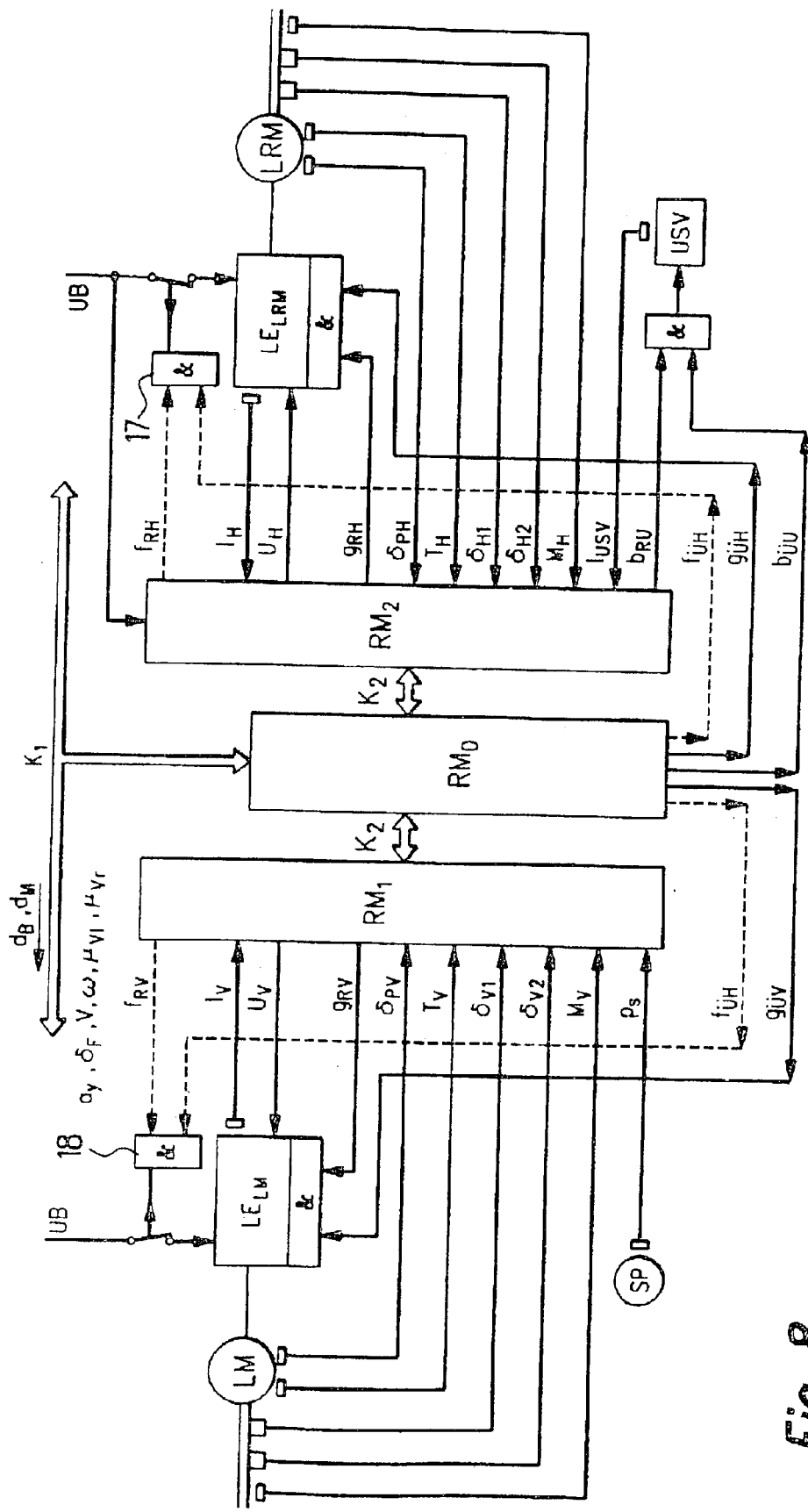
FIG. 8 shows a control device structure having three microcomputers.

In the embodiment variant according to FIG. 8 the functions of the control devices are divided among three microcomputer systems. Component $RM_1$ assumes responsibility for regulating and monitoring the functions of the steering motor and monitoring the pressure of the hydraulic auxiliary level. Component $RM_2$ is tasked with regulating the steering wheel feedback actuator and triggering the auxiliary level. Both components can exchange data with one another via communication system $K_2$.

The functions described in section F (structure of monitoring) at the level of the monitoring component are now taken over by computing unit $RM_0$, which is also responsible for communication with other computer components.

Figure 9:
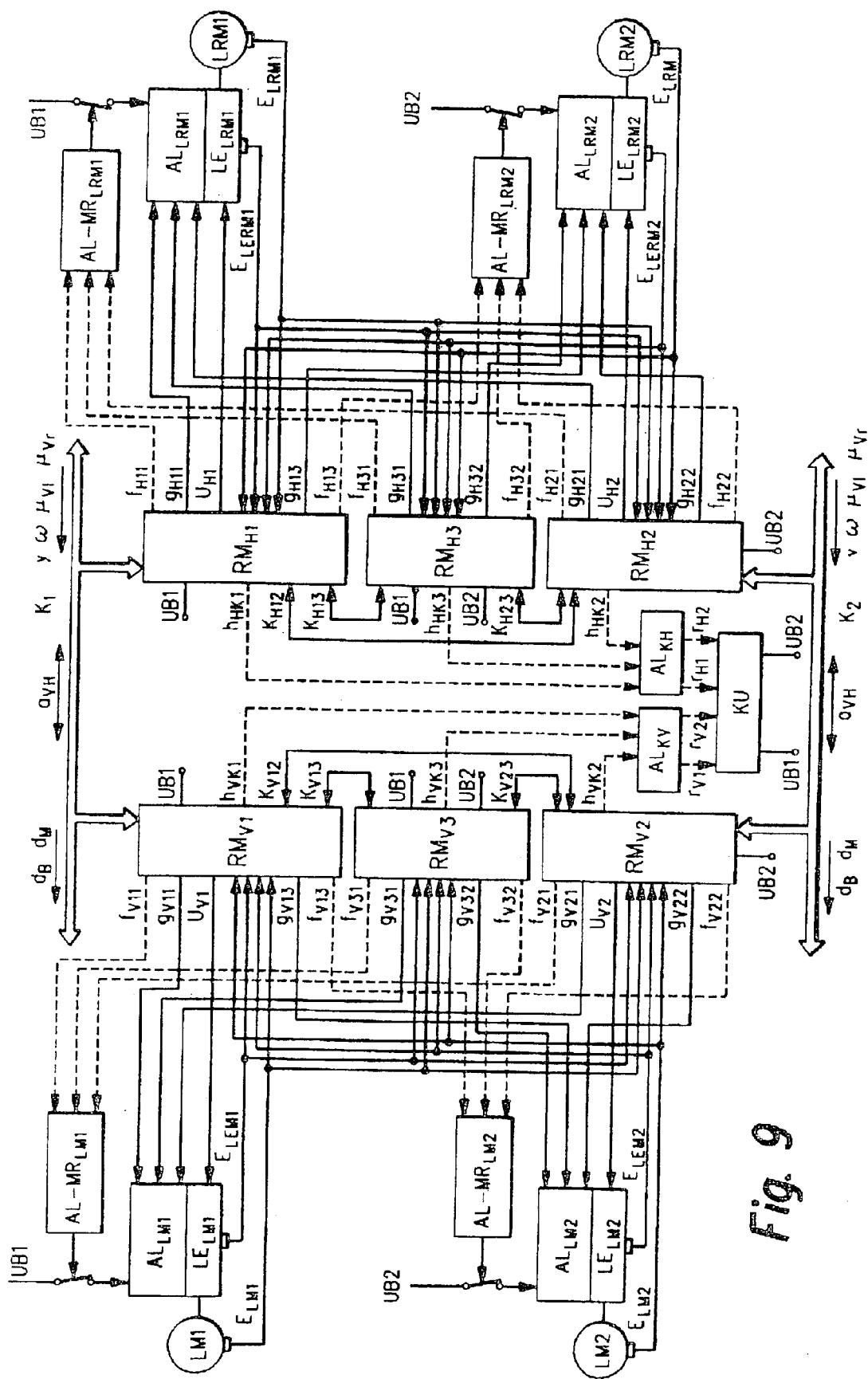
FIG. 9 shows a control device structure of another steer-by-wire steering system according to the present invention.

In FIG. 9, an embodiment of a steer-by-wire steering system according to the present invention is shown including six microcomputers ($RM_{H1}$, . . . , $RM_{v3}$) and a mechanical auxiliary level, in which the steering wheel actuator is implemented with the two independent electric motors LRM1 and LRM2. In a further variant, the two electric motors might also be arranged with a common drive shaft and a common housing, so that only the motor windings are implemented redundantly. This variant of the electric motor may also be used with the steering motor.

Microcomputers $RM_{H1}$, $RM_{H2}$ and $RM_{H3}$ assume the control and regulation functions of the feedback actuator. Microcomputers $RM_{v1}$, $RM_{v2}$ and $RM_{v3}$ together constitute the redundant computer system for the triggering and regulation of the feedback actuator. Feedback actuator microcomputers $RM_{H1}$ exchange their calculated data via communication links, $K_{H12}$, $K_{H13}$, and $K_{H23}$. Microcomputers $RM_{v1}$ of the steering actuator communicate in the same way via communication links $K_{v12}$, $K_{v13}$, and $K_{v23}$. The microcomputers shown, $RM_{v1}$ and $RM_{H1}$, include the necessary peripheral components for acquiring all sensor signals. Moreover they also include the essential processing functions for calculating trigger signals $U_{H1}$ and $U_{H2}$ for steering wheel motors LRM and $U_{v1}$ and $U_{v2}$ for triggering steering motors LM. In the variant shown, the feedback actuator is implemented by two independent motors LRM1 and LRM2, which are controlled by independent power electronics units $LE_{LRM1}$, and $LE_{LRM2}$. Both motors are connected to the same shaft. The steering actuator is also redundantly constructed through two motors LM1 and LM2 and the associated power electronics units $LE_{LM1}$, and $LE_{LM2}$. Power for the electronics components of the SbW steering system is supplied by independent power supplies UB1 and UB2.

Power is supplied to microcomputer systems $RM_{H1}$ and $RM_{v1}$, as well as the motors LRM1 and LM1 together with the associated power electronics and cut-off logic ($AL_{LRM1}$, $AL-MR_{LRM1}$, $AL_{LM1}$, $AL-MR_{LM1}$) by UB1. Power source UB2 supplies microcomputer systems $RM_{H2}$ and $RM_{v2}$ as well as motors LRM2 and LM2 together with the associated power electronics and cut-off logic, ($AL_{LRM2}$, $AL-MR_{LRM2}$, $AL_{LM2}$, $AL-MR_{LM2}$). Microcomputers $RM_{H3}$ and $RM_{v3}$ as well as electromagnetic coupling KU are supplied by both power sources. $K_1$ and $K_2$ each indicate an independent communication system, e.g., in the form of a serial bus that enables communication between computer components $RM_{H1}$ for the feedback actuator and components $RM_{v1}$, for the steering actuator. The data exchanged between these components is designated by $a_{vH}$. These communication systems $K_1$ and $K_2$ also allow communication with other control devices in the vehicle.

The following functions are implemented in components $RM_{H1}$, $RM_{H2}$ and $RM_{v3}$:

sensor signal acquisition and calculation of trigger signals $U_{H1}$ and $U_{H2}$ for regulating steering wheel motors LRM1 and LRM2;

exchange of calculated data via communication links $KH_{12}$, $KH_{13}$ and $KH_{23}$, operating between the microcomputer units; comparison of computing results and initiation of an auxiliary level strategy as necessary;

switching to the auxiliary level;

interface with other control devices and display units.

The following functions are implemented in components $RM_{v1}$, $RM_{v2}$ and $RM_{v3}$:

sensor signal acquisition and calculation of trigger signals $U_{v1}$ and $U_{v2}$ for regulating steering motor LM1 and LM2;

exchange of calculated data via communication links $K_{v12}$, $K_{v13}$ and $K_{v23}$ operating between the microcomputer units; comparison of computing results and initiation of an auxiliary level strategy as necessary;

switching to the auxiliary level;

interface with other control devices and display units.

These functions will be described in the following.

A: Sensor signal acquisition and calculation of control signals for regulating the steering wheel motor The signals indicated in the embodiment according to FIG. 5 for triggering steering wheel motors LRM1 and LRM2 are acquired via peripheral signal acquisition components and fed to microcomputer systems $RM_{H1}$, $RM_{H2}$ and $RM_{H3}$. Redundant components are acquired separately. Redundant sensors each transfer one signal, In the following, redundancy of components and sensors is indicated using subscript:

The acquired signals are combined in FIG. 9 for motor LRM1 under the notation $E_{LRM1}$, and for motor LRM2 under the notation $E_{LRM2}$.

Trigger signals $U_{H1}$ and $U_{H2}$ serve primarily to trigger power electronics units $LE_{LRM1}$ and $LE_{LRM2}$. Steering wheel motor LRM1 is controlled via power electronics $LE_{LRM1}$ if an enable is queued via cut-off logic $AL_{LRM1}$ and the motor relay is also closed by cut-off logic $AL\text{-}MR_{LRM1}$. In a similar manner, steering wheel motor LRM2 is triggered by power electronics $LE_{LRM2}$ if an enable is queued via cut-off logic $AL_{LRM2}$ and the motor relay is closed by cut-off logic $AL\text{-}MR_{LRM2}$;

B: Sensor signal acquisition and calculation of control signals for regulating steering motors To trigger steering motors LM1 and LM2, the signals indicated with reference to the embodiment shown in FIG. 5 are acquired by peripheral signal acquisition components and fed to the microcomputer systems $RM_{v1}$, $RM_{v2}$ and $RM_{v3}$.

These signals are combined in FIG. 9 for motor LM1 under the notation $E_{LM1}$, and for motor LM2 under the notation $E_{LM2}$.

Trigger signals $U_{v1}$ and $U_{v2}$ serve primarily to trigger power electronics units $LE_{LM1}$ and $LE_{LM2}$. These trigger signals are manipulated variables of a digital regulator and may be output, for example, in the form of PWM signals. Manipulated variables $U_{v1}$ are formed from a representative value of measured steering wheel angles $\delta_{H1}$ and $\delta_{H2}$ and the current steering transfer ratio. With respect to steering interventions by a dynamic driving system, the description of the exemplary embodiment of FIG. 5 applies accordingly.

Steering motor LM1 is triggered by power electronics $LE_{LM1}$ if an enable is queued via cut-off logic $AL_{LM1}$ and the motor relay is also closed by cut-off logic $AL\text{-}MR_{LM1}$. Similarly, steering motor LM2 is controlled by power electronics $LE_{LM2}$, if an enable is signal queued via cut-off logic $AL_{LM2}$ and motor relay is also closed by cut-off logic $AL\text{-}MR_{LM2}$.

C:4 Monitoring the auxiliary level and switching to the auxiliary level

The currents in both windings $S_1$ and $S_2$ of the coupling are essential parameters in the availability of auxiliary level of the SbW steering system. These currents are acquired continuously. In order to check the switching function to the mechanical auxiliary level, the electrical circuits of the coupling windings are interrupted alternately in driving mode by signals $r_{v1}$, and $r_{v2}$ or $r_{H1}$ and $r_{H2}$. A switch to the mechanical auxiliary level is possible if the respective winding currents return to the value zero.

D: Interface with other control devices and display units

The description given with reference to the exemplary embodiment of FIG. 5 applies accordingly.

E: Safety measures in the control device

The measures necessary in order to ensure that the safety standards imposed on this system are satisfied are the same as those included in the description of FIG. 5 under "E". In order to meet these safety requirements, the following is provided:

All measurement signals $E_{LRM1}$ and $E_{LRM2}$ incident at both motors LRM1 and LRM2, as well as all measurement signals $E_{LERM1}$ and $E_{LERM2}$ from power electronics $LE_{LRM1}$, and $LE_{LRM2}$, are acquired in three computing modules $RM_{H1}$, $RM_{H2}$, and $RM_{H3}$. The acquired measurement signals are exchanged among the modules via computer links $K_{H12}$, $K_{H13}$, and $K_{H23}$, and compared with each other for plausibility. A reference value is then created for each measured variable, by a 2 out of 3 majority vote for example. This allows a faulty input channel of a measured variable to be located unambiguously. A faulty input channel is then excluded from further calculations. At the same time this error is stored in an error memory. Then, subsequent calculations are performed in all three calculation modules with these reference values from the individual measured variables, or this reference value is made available to computer modules $RM_{v1}$, $RM_{v2}$, and $RM_{v3}$ of the steering actuator in the form of communication datum $a_{vH}$ via communication systems $K_1$ and $K_2$.

The calculations for the formation of trigger signals $U_{H1}$ and $U_{H2}$ for steering wheel motors LRM1 and LRM2 are also executed redundantly in all microcomputer systems $RM_{H1}$, $RM_{H2}$, and $RM_{H3}$. The results are again exchanged via link paths $KH_{12}$, $KH_{13}$, and $KH_{23}$, among one another and checked against one another for plausibility. This method of an implementation variant for initiating the cut-off strategy is explained using the example of the calculation of trigger signal $U_{H1}$. The results calculated in microcomputer systems $RM_{H1}$, $RM_{H2}$, and $RM_{H3}$ are indicated by $U_{H11}$, $U_{H12}$, $U_{H13}$. If an error is located in $U_{H1}$ during comparison of these results in computing unit $RM_{H1}$, and the error still persists after the expiry of an error tolerance interval, the enable signals for power electronics $g_{H11}$ and for motor relay $f_{H11}$ are disabled, and the enable signal to link trigger $h_{Hk1}$ is reset. If an error is located in $U_{H11}$ during comparison of computer results $U_{H11}$, $U_{H12}$, and $UH_{13}$ in computing units $RM_{H3}$ or $RM_{H2}$, the corresponding enable signals $g_{H31} f_{H31}$ and $h_{HK3}$ or $g_{H21}$, $f_{H21}$ and $h_{HK2}$ are reset.

Trigger signals $U_{H1}$ and $U_{H2}$ are not released until enable signals $m_{H1}$ or $m_{H2}$ are pending within the cut-off logic units for the power electronics of steering wheel motors $AL_{LRM1}$ or $AL_{LRM2}$.

Figure 10:
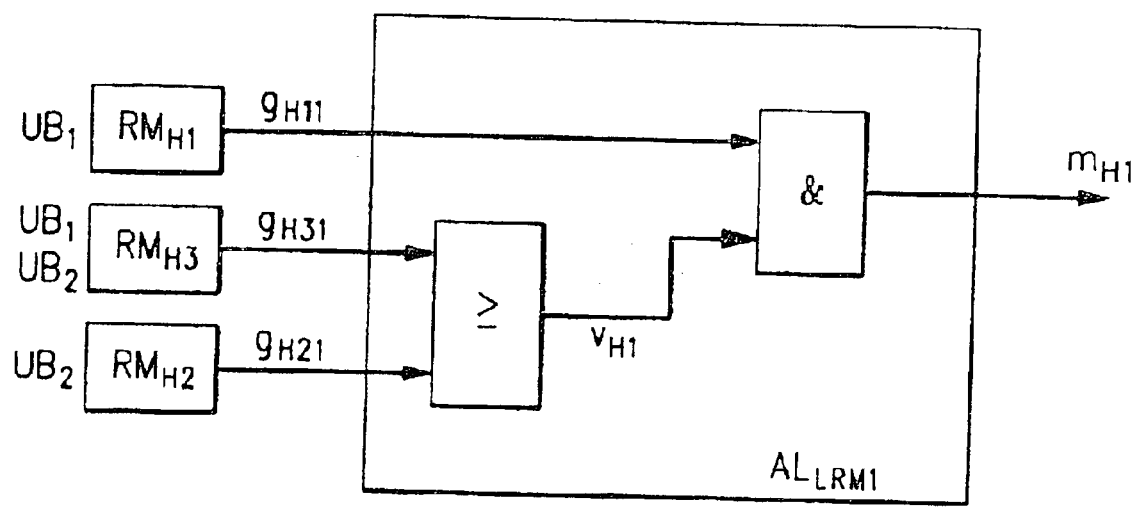
FIG. 10 shows a logic circuit for triggering the enable signals for the power electronics units.

The logic circuit arrangement for creating enable signals to activate trigger signal $U_{H1}$ is shown as an example in FIG. 10 for the enable signal $m_{H1}$ for the power electronics of steering wheel motor $LE_{LRM1}$. This ensures that an error that has occurred during calculation of $U_{H1}$ in $RM_{H1}$ results directly in the disconnection of power electronics $LE_{LRM1}$ as soon as it is detected either by computing system $RM_{H1}$ or indirectly to the disconnection of the same power electronics as soon as it is detected jointly by modules $RM_{H2}$ and $RM_{H3}$. The enable signals may be implemented statically; the function of the switching transfer is then monitored by re-reading. For this purpose, these enable signals may be set and reset cyclically in test phases. A further variant provides for dynamic trigger of the enable signals.

Figure 11A:
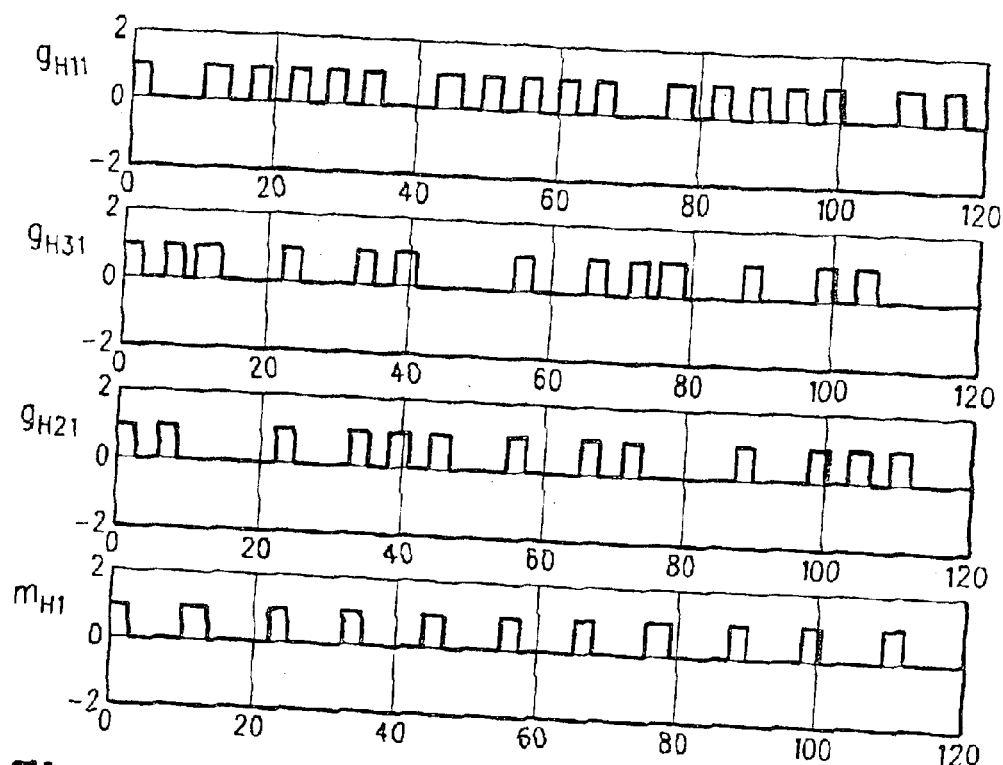
FIG. 11 shows the dynamic triggering of the enable signals of the power electronics units.

The time characteristic of signals $g_{H11}$, $g_{H31}$, and $g_{H21}$ of such a method in error-free operation is shown in FIG. 11a. The resulting enable signal $m_{H1}$ may be monitored in its correct time sequence by a watchdog unit.

Figure 11B:
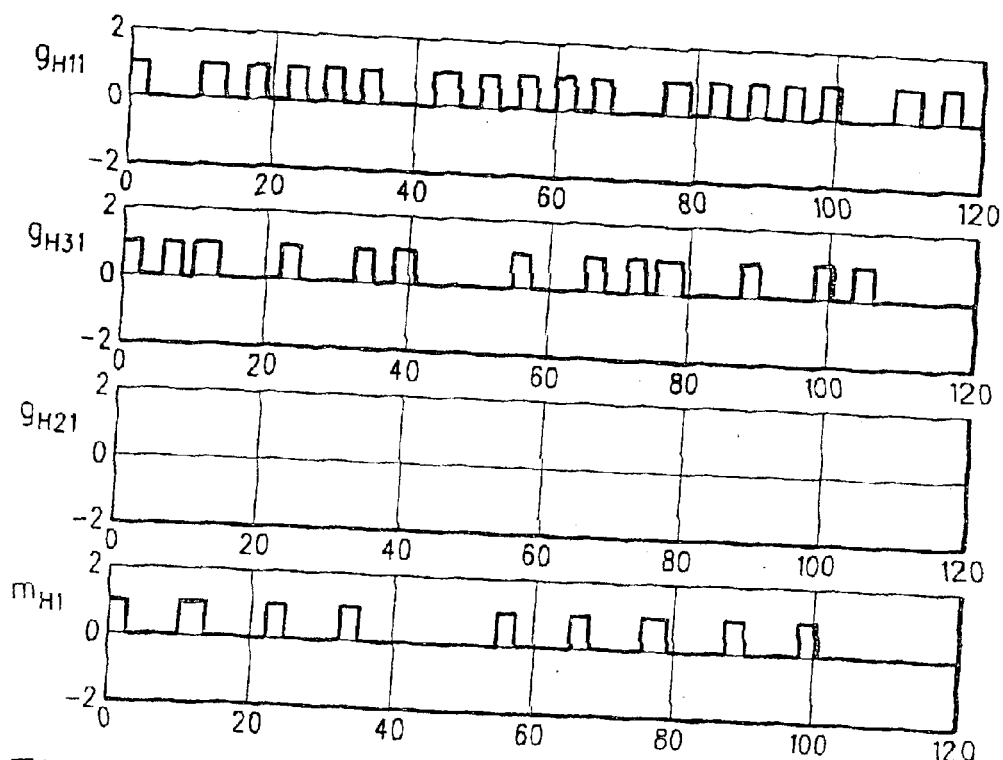
Figure 11C:
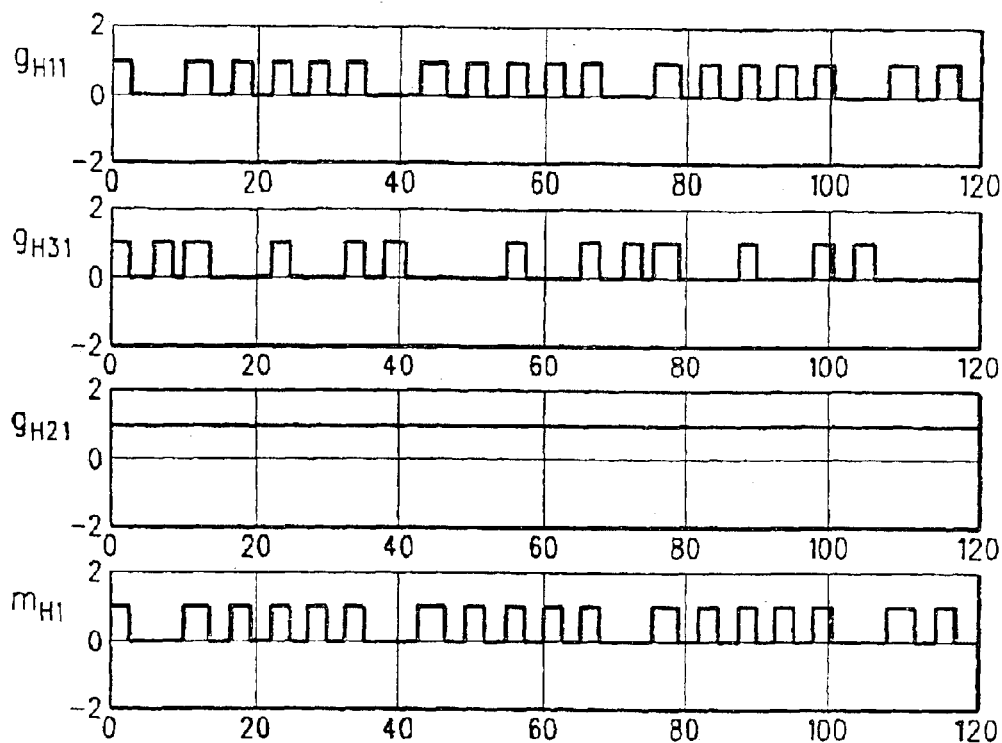
Figure 11D:
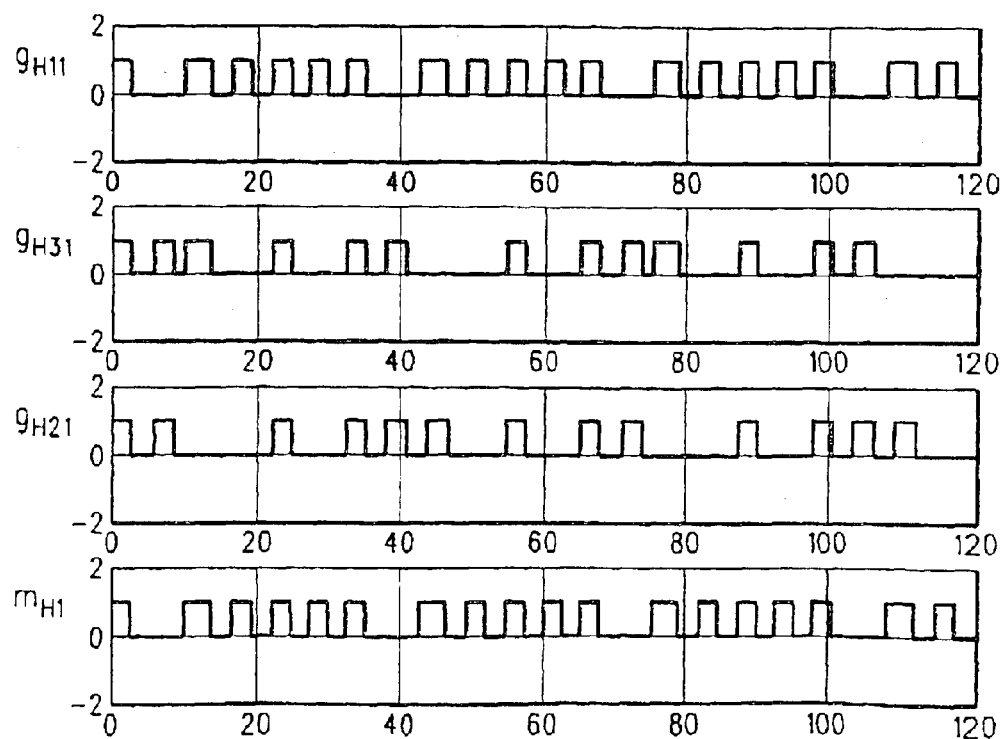

In FIGS. 11b to 11d potential errors in the enable signals are illustrated, together with their effect on enable signal $m_{H1}$. In FIG. 11b, signal $g_{H21}$ is registered at the low value and in FIG. 11c at the high value. FIG. 11d shows the effect of an error resulting from freezing of intermediate signal $v_{H1}$ at the high signal.

Cut-off logic may trigger motor relay $AL\text{-}MR_{LRM1}$ with a circuit arrangement as shown in FIG. 10. In this case enable signals $f_{H11}$, $f_{H31}$ and $f_{H21}$ must be used instead of enable signals $g_{H11}$, $g_{H31}$ and $g_{H21}$.

Figure 12:
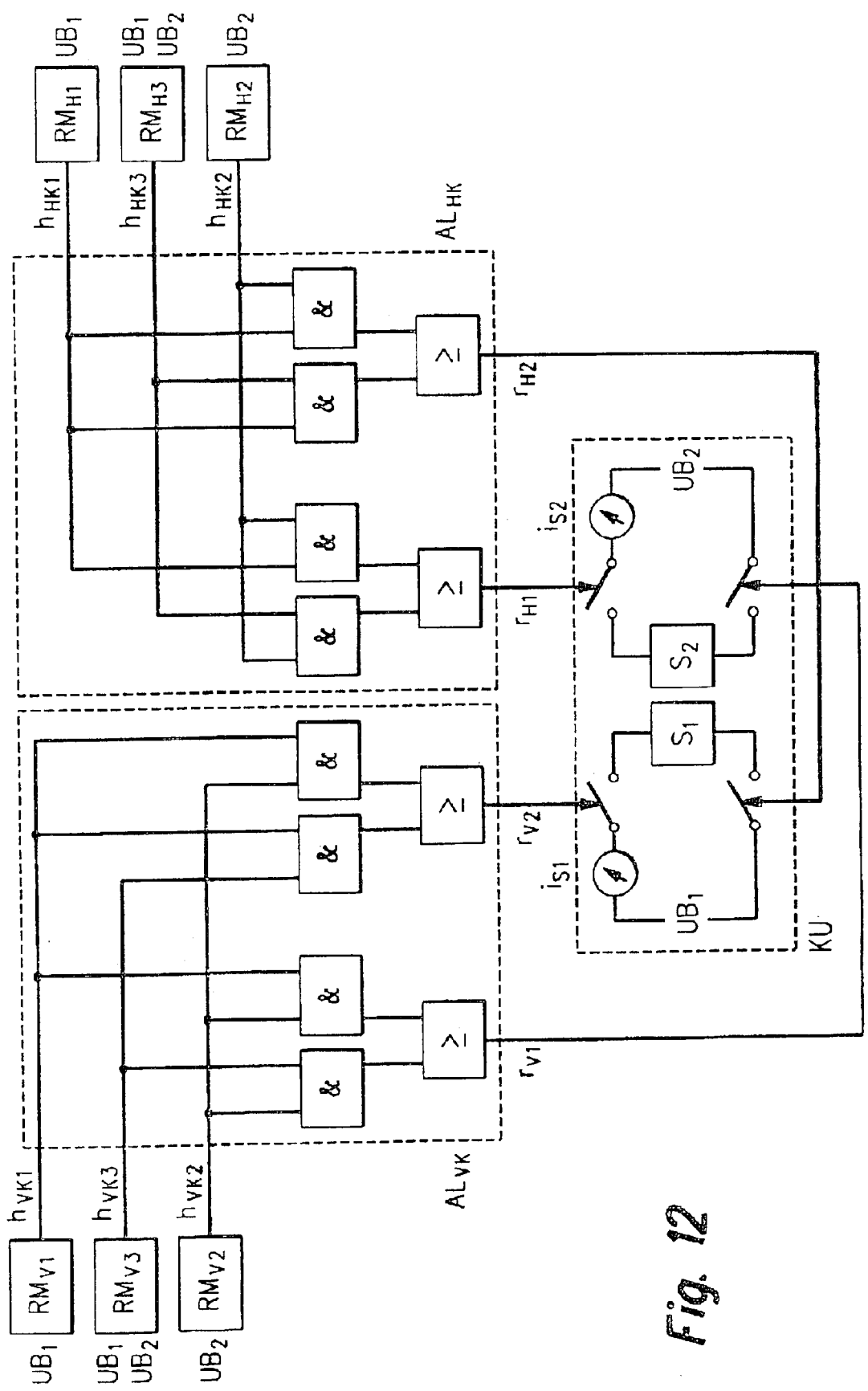
FIG. 12 shows a logic circuit for triggering of the coupling.

The coupling unit is triggered with a variant of a circuit arrangement as shown in FIG. 12. Since in each case the coupling may only be maintained in an open state (SbW operation) when windings $S_1$, and $S_2$ are energized, this arrangement ensures that a single error cannot cause immediate switching to the mechanical auxiliary level. Each single error triggers only one interruption of the electrical winding circuits via enable signals $r_{v1}$, $r_{v2}$, $r_{H1}$ and $r_{H2}$, in each case. In order to guarantee correct functioning in the event of an error, the individual switches are controlled in the opening state in cyclical test phases in driving mode. The ability to open may be detected by monitoring the characteristic of currents $i_{s1}$ and $i_{s2}$.

These measures may be applied in a corresponding manner for the feedback actuator, The control device structures previously described are also suitable for steer-by-wire steering systems according to FIG. 1a. Only the monitoring of the reservoir pressure necessary for the hydraulic auxiliary level is omitted. However, the switchover valve USV shown in these structures must be replaced by a coupling control system. The trigger signals $g_{\ddot{u}H}$ and $g_{\ddot{u}U}$ necessary for this are generated in accordance with the arrangements for the hydraulic auxiliary level in the event of an error, so that secure switching to the mechanical auxiliary level with direct steering intervention is assured as soon as errors occur.

What is claimed is:

1. A method of operating a control device for a steer-by-wire steering system of a vehicle, comprising:
   acquiring a plurality of input signals associated with:
      a plurality of steering wheel angles,
      a plurality of steering angles,
      a plurality of restoring torques operating on a plurality of steered wheels, and
      a plurality of transfer torques from at least one feedback actuator to a steering mechanism;
   monitoring the plurality of input signals by at least one of a plurality of plausibility checks and an analytic redundancy;
   triggering at least one of a plurality of steering actuators operating on the plurality of steered wheels depending on one of the plurality of steering wheel angles;
   triggering the at least one feedback actuator operating on a steering wheel depending on the plurality of restoring torques;
   communicating with one of at least one control device and at least one sensor situated in the vehicle;
   monitoring a plurality of control device functions, a first availability of an auxiliary level, and a second availability of an arrangement for activating the auxiliary level; and
   switching from a steer-by-wire steering to the auxiliary level upon an occurrence of an error in the steer-by-wire steering;
   wherein the plurality of steering actuators are triggered by a plurality of control signals for a plurality of phase currents and at least one enable signal.

2. The method according to claim 1, further comprising determining the one of the plurality of steering wheel angles by at least one steering wheel angle sensor.

3. The method according to claim 1, further comprising determining one of the plurality of steering angles by at least one steer angle sensor.

4. The method according to claim 1, wherein at least one of the plurality of steering actuators and the at least one feedback actuator are controlled by an enable circuit via a motor relay.

5. The method according to claim 1, wherein a communication with one of the at least one control device and the at least one sensor occurs redundantly.

6. The method according to claim 1, further comprising providing four logic levels for monitoring the plurality of control device functions and the first availability of the auxiliary level.

7. A method of operating a control device for a steer-by-wire steering system of a vehicle, comprising:
   acquiring a plurality of input signals associated with:
      a plurality of steering wheel angles,
      a plurality of steering angles,
      a plurality of restoring torques operating on a plurality of steered wheels, and
      a plurality of transfer torques from at least one feedback actuator to a steering mechanism;
   monitoring the plurality of input signals by at least one of a plurality of plausibility checks and an analytic redundancy;
   triggering at least one of a plurality of steering actuators operating on the plurality of steered wheels depending on one of the plurality of steering wheel angles;
   triggering the at least one feedback actuator operating on a steering wheel depending on the plurality of restoring torques;
   communicating with one of at least one control device and at least one sensor situated in the vehicle;
   monitoring a plurality of control device functions, a first availability of an auxiliary level, and a second availability of an arrangement for activating the auxiliary level; and
   switching from a steer-by-wire steering to the auxiliary level upon an occurrence of an error in the steer-by-wire steering;
   wherein the plurality of restoring torques are acquired by at least one restoring torque sensor using at least one of:
      a computing model of the vehicle depending on at least one of a plurality of dynamic driving variables; and
      a plurality of phase currents of at least one of the plurality of steering actuators.

8. The method according to claim 7, wherein the plurality of steering actuators are triggered by a plurality of control signals for a plurality of phase currents and at least one enable signal.

9. A method of operating a control device for a steer-by-wire steering system of a vehicle comprising:
   acquiring a plurality of input signals associated with:
      a plurality of steering wheel angles,
      a plurality of steering angles,
      a plurality of restoring torques operating on a plurals of steered wheels, and
      a plurality of transfer torques from at least one feedback actuator to a steering mechanism;
   monitoring the plurality of input signals at least one of a plurality of plausibility checks and an analytic redundancy;
   triggering at least one of a plurality of steering actuators operating on the plurality of steered wheels depending on one of the plurality of steering wheel angles;
   triggering the at least one feedback actuator operating on a steering wheel depending n the plurality of restoring torques;
   communicating with one of at least one control device and at least one sensor situated in the vehicle;
   monitoring a plurality of control device functions, a first availability of an auxiliary level, and a second availability of an arrangement for activating the auxiliary level; and
   switching from a steer-by-wire steering to the auxiliary level upon an occurrence of an error in the steer-by-wire steering;

wherein a hand torque transferred to the steering wheel by the at least one feedback actuator is determined from the one of the plurality of steering wheel angles and a plurality of phase currents of the at least one feedback actuator.

10. The method according to claim 9, wherein the plurality of steering actuators are triggered by a plurality of control signals for a plurality of phase currents and at least one enable signal.

11. A method of operating a control device for a steer-by-wire steering system of a vehicle, comprising:
   acquiring a plurality of input signals associated with:
      a plurality of steering wheel angles,
      a plurality of steering angles,
      a plurality of restoring torques operating on a plurality of steered wheels, and
      a plurality of transfer torques from at least one feedback actuator to a steering mechanism;
   monitoring the plurality of input signals by at least one of a plurality of plausibility checks and an analytic redundancy;
   triggering at least one of a plurality of steering actuators operating on the plurality of steered wheels depending on one of the plurality of steering wheel angles;
   triggering the at least one feedback actuator operating on a steering wheel depending on the plurality of restoring torques;
   communicating with one of at least one control device and at least one sensor situated in the vehicle;
   monitoring a plurality of control device functions, a first availability of an auxiliary level, and a second availability of an arrangement for activating the auxiliary level: and
   switching from a steer-by-wire steering to the auxiliary level upon an occurrence of an error in the steer-by-wire steering;
   wherein the switching from the steer-by-wire steering to the auxiliary level only takes place after a transition time has elapsed following the occurrence of the error.

12. A method of operating a control device for a steer-by-wire steering system of a vehicle, comprising:
   acquiring a plurality of input signals associated with:
      a plurality of steering wheel angles,
      a plurality of steering angles,
      a plurality of restoring torques operating on a plurality of steered wheels, and
      a plurality of transfer torques from at least one feedback actuator to a steering mechanism;
   monitoring the plurality of input signals by at least one of a plurality of plausibility checks and an analytic redundancy,
   triggering at least one of a plurality of steering actuators operating on the plurality of steered wheels depending on one of the plurality of steering wheel angles;
   triggering the at least one feedback actuator operating on a steering wheel depending on the plurality of restoring torques;
   communicating with one of at least one control device and at least one sensor situated in the vehicle;
   monitoring a plurality of control device functions, a first availability of an auxiliary level, and a second availability of an arrangement for activating the auxiliary level; and
   switching from a steer-by-wire steering to the auxiliary level upon an occurrence of an error in the steer-by-wire steering;
   wherein the plurality of input signals further includes at least one of:
      at least one rotor position of the at least one feedback actuator; and
      at least one rotor position of the plurality of steering actuators.

13. A method of operating a control device for a steer-by-wire steering system of a vehicle, comprising:
   acquiring a plurality of input signals associated with:
      a plurality of steering wheel angles,
      a plurality of steering angles,
      a plurality of restoring torques operating on a plurality of steered wheels, and
      a plurality of transfer torques from at least one feedback actuator to a steering mechanism;
   monitoring the plurality of input signals by at least one of a plurality of plausibility checks and an analytic redundancy;
   triggering at least one of a plurality of steering actuators operating on the plurality of steered wheels depending on one of the plurality of steering wheel angles;
   triggering the at least one feedback actuator operating on a steering wheel depending on the plurality of restoring torques;
   communicating with one of at least one control device and at least one sensor situated in the vehicle;
   monitoring a plurality of control device functions a first availability of an auxiliary level, and a second availability of an arrangement for activating the auxiliary level; and
   switching from a steer-by-wire steering to the auxiliary level upon an occurrence of an error in the steer-by-wire steering;
   wherein:
      the auxiliary level includes a hydraulic auxiliary level; and
      the monitoring further includes monitoring a pressure of a pressure reservoir of the hydraulic auxiliary level.

14. A method of operating a control device for a steer-by-wire steering system of a vehicle, comprising:
   acquiring a plurality of input signals associated with:
      a plurality of steering wheel angles,
      a plurality of steering angles,
      a plurality of restoring torques operating on a plurality of steered wheels, and
      a plurality of transfer torques from at least one feedback actuator to a steering, mechanism;
   monitoring the plurality of input signals by at least one of a plurality of plausibility checks and an analytic redundancy;
   triggering at least one of a plurality of steering actuators operating on the plurality of steered wheels depending on one of the plurality of steering wheel angles;
   triggering the at least one feedback actuator operating on a steering wheel depending on the plurality of restoring torques;
   communicating with one of at least one control device and at least one sensor situated in the vehicle;
   monitoring a plurality of control device functions, a first availability of an auxiliary level, and a second availability of an arrangement for activating the auxiliary level; and
   switching, from a steer-by-wire steering to the auxiliary level upon an occurrence of an error in the steer-by-wire steering;

calculating a plurality of manipulated variables;
wherein the plurality of input signals further includes at least one terminal voltage of at least one voltage source of the steer-by-wire steering system; and
wherein the calculating of the manipulated variables takes into account the at least one terminal voltage.

15. A method of operating a control device for a steer-by-wire steering system of a vehicle: comprising:
acquiring a plurality of input signals associated with:
a plurality of steering wheel angles,
a plurality of steering angles,
a plurality of restoring torques operating on a plurality of steered wheels, and
a plurality of transfer torques from at least one feedback actuator to a steering mechanism;
monitoring the plurality of input signals by at least one of a plurality of plausibility checks and an analytic redundancy;
triggering at least one of a plurality of steering actuators operating on the plurality of steered wheels depending on one of the plurality of steering wheel angles;
triggering the at least one feedback actuator operating on a steering wheel depending on the plurality of restoring torques;
communicating with one of at least one control device and at least one sensor situated in the vehicle;
monitoring a plurality of control device functions, a first availability of an auxiliary level, and a second availability of an arrangement for activating the auxiliary level;
switching from a steer-by-wire steering to the auxiliary level upon an occurrence of an error in the steer-by-wire steering; and
providing four logic levels for monitoring the plurality of control device functions and the first availability of the auxiliary level;
wherein a first logic level of the four logic levels includes:
the plurality of plausibility checks of the plurality of input signals;
a selection of the plurality of steering wheel angles and the plurality of steering angles, the selection used for processing from a plurality of redundant signals available in each case;
a plurality of calculations of a plurality of regulation functions for triggering the at least one feedback actuator and the at least one of the plurality of steering actuators; and
an alteration of a triggering of the arrangement for activating the auxiliary level in the occurrence of the error.

16. A method of operating a control device for a steer-by-wire steering system of a vehicle comprising:
acquiring a plurality of input signals associated with:
a plurality of steering wheel angles,
a plurality of steering angles,
a plurality of restoring torques operating on a plurality of steered wheels, and
a plurality of transfer torques from at least one feedback actuator to a steering mechanism;
monitoring the plurality of input signals by at least one of a plurality of plausibility checks and an analytic redundancy;
triggering at least one of a plurality of steering actuators operating on the plurality of steered wheels depending on one of the plurality of steering wheel angles;
triggering the at least one feedback actuator operating on a steering wheel depending on the plurality of restoring torques;
communicating with one of at least one control device and at least one sensor situated in the vehicle;
monitoring a plurality of control device functions, a first availability of an auxiliary level, and a second availability of an arrangement for activating the auxiliary level;
switching from a steer-by-wire steering to the auxiliary level upon an occurrence of an error in the steer-by-wire steering;
providing four logic levels for monitoring the plurality of control device functions and the first availability of the auxiliary level; and
checking a plurality of calculations performed at a first logic level of the four logic levels at a second logic level of the four logic levels using a plurality of dissimilar algorithm.

17. A method or operating a control device for a steer-by-wire steering system of a vehicle, comprising:
acquiring a plurality of input signals associated with:
a plurality of steering wheel angles,
a plurality of steering angles,
a plurality of restoring torques operating on a plurality of steered wheels, and
a plurality of transfer torques from at least one feedback actuator to a steering mechanism;
monitoring the plurality of input signals by at least one of a plurality of plausibility checks and an analytic redundancy;
triggering at least one of a plurality of steering actuators operating on the plurality of steered wheels depending on one of the plurality of steering wheel angles;
triggering the at least one feedback actuator operating on a steering wheel depending on the plurality of restoring torques;
communicating with one of at least one control device and at least one sensor situated in the vehicle;
monitoring a plurality of control device functions, a first availability of an auxiliary level, and a second availability of an arrangement for activating the auxiliary level;
switching from a steer-by-wire steering to the auxiliary level upon an occurrence of an error in the steer-by-wire steering;
providing four logic levels for monitoring the plurality of control device functions and the first availability of the auxiliary level;
retrieving at a third logic level of the four logic levels a query from a monitoring module;
answering the query by taking into account each of a plurality safety-relevant subroutines within a predetermined time interval; and
resetting a plurality of enable signals for triggering a plurality of power electronics of the at least one of the plurality of steering actuators and the at least one feedback actuator upon detecting the occurrence of the error by a second logic level of the four logic levels and the third logic level.

18. A method of operating a control device for a steer-by-wire steering system of a vehicle, comprising:
acquiring a plurality of input signals associated with:
a plurality of steering wheel angles, a plurality of steering angles,
a plurality of restoring torques operating on a plurality of steered wheels, and
a plurality of transfer torques from at least one feedback actuator to a steering mechanism;
monitoring the plurality of input signals by at east one of a plurality of plausibility checks and an analytic redundancy;
triggering at least one of a plurality of steering actuators operating on the plurality of steered wheels depending on one of the plurality of steering wheel angles;
triggering the at least one feedback actuator operating on a steering wheel depending on the plurality of restoring torques;
communicating with one of at least one control device and at least one sensor situated in the vehicle;
monitoring a plurality of control device functions, a first availability of an auxiliary level, and a second availability of an arrangement for activating the auxiliary level;
switching from a steer-by-wire steering to the auxiliary level upon an occurrence of an error in the steer-by-wire steering;
providing four logic levels for monitoring the plurality of control device functions and the first availability of the auxiliary level;
checking at a fourth logic level of the four logic levels an answer from a third logic level of the four logic levels with respect to an exact bit match and a response time; and
resetting a plurality of enable signals for triggering the plurality of steering actuators and the at least one feedback actuator, a plurality of enable signals for triggering a first motor relay and a second motor relay, and a trigger signal for a plurality of power electronics of at least one of the plurality of steering actuators and the at least one feedback actuator, if a query-answer communication with the third logic level is not executed properly.

19. A computer program suitable for causing a processing device to execute a method, the method comprising:
acquiring a plurality of input signals associated with:
a plurality of steering wheel angles,
a plurality of steering angles,
a plurality of restoring torques operating on a plurality of steered wheels, and
a plurality of transfer torques from at least one feedback actuator to a steering mechanism;
monitoring the plurality of input signals by at least one of a plurality of plausibility checks and an analytic redundancy;
triggering at least one of a plurality of steering actuators operating on the plurality of steered wheels depending on one of the plurality of steering wheel angles;
triggering the at least one feedback actuator operating on a steering wheel depending on the plurality of restoring torques;
communicating with one of at least one control device and at least one sensor situated in the vehicle;
monitoring a plurality of control device functions, a first availability of an auxiliary level, and a second availability of an arrangement for activating the auxiliary level; and
switching from a steer-by-wire steering to the auxiliary level upon an occurrence of an error in the steer-by-wire steering;
wherein:
the control device includes at least one of at least one microcomputer and at least one monitoring module,
the at least one microcomputer assumes a plurality of tasks of a first logic level, a second logic level, and a third logic level, and
the at least one monitoring module assumes a plurality of tasks of a fourth logic level.

20. The computer program according to claim 19, wherein the computer program is stored on a storage medium.

21. A control device for controlling a steer-by-wire steering system, wherein the control device operates according to a method, the method comprising:
acquiring a plurality of input signals associated with:
a plurality of steering wheel angles,
a plurality of steering angles,
a plurality of restoring torques operating on a plurality of steered wheels, and
a plurality of transfer torques from at least one feedback actuator to a steering mechanism;
monitoring the plurality of input signals by at least one of a plurality of plausibility checks and an analytic redundancy;
triggering at least one of a plurality of steering actuators operating on the plurality of steered wheels depending on one of the plurality of steering wheel angles;
triggering the at least one feedback actuator operating on a steering wheel depending on the plurality of restoring torques;
communicating with one of at least one control device and at least one sensor situated in the vehicle;
monitoring a plurality of control device functions, a first availability of an auxiliary level, and a second availability of an arrangement for activating the auxiliary level; and
switching from a steer-by-wire steering to the auxiliary level upon an occurrence of an error in the steer-by-wire steering;
wherein:
the control device includes at least one of at least one microcomputer and at least one monitoring module,
the at least one microcomputer assumes a plurality of tasks of a first logic level, a second logic level, and a third logic level, and
the at least one monitoring' module assumes a plurality of tasks of a fourth logic level.

22. The control device according to claim wherein:
the at least one microcomputer includes a plurality of microcomputers, the plurality of microcomputers checking each other reciprocally; and
at least one of the plurality of microcomputers assumes a plurality of tasks of a fourth logic level.

23. The control device according to claim 21, wherein the control device triggers at least one of the at least one feedback actuator and the plurality of steering actuators via a plurality of power electronics in each case.

24. A steer-by-wire steering system for a vehicle, comprising:
a feedback actuator acting on a steering wheel;
an arrangement for acquiring a steering wheel angle;
an arrangement for acquiring a hand torque;
a steering actuator;
an arrangement for acquiring a steering angle;
an arrangement for acquiring a restoring torque;

a communications arrangement; and a control device, wherein the control device is for controlling the steer-by-wire steering system, and wherein an actuation of the control device provides for performance of the following:
- acquiring a plurality of input signals, the plurality of input signals associated with:
  - the steering wheel angle,
  - the steering angle,
  - the restoring torque operating, on a plurality of steered wheels, and
  - a plurality of transfer torques from the feedback actuator to a steering mechanism,
- monitoring the plurality of input signals by at least one of a plurality plausibility checks and an analytic redundancy,
- triggering the steering actuator operating on the plurality of steered wheels depending on the steering wheel angle,
- triggering the feedback actuator operating on the steering wheel depending on the plurality of restoring torques operating on each of the plurality of steered wheels,
- communicating with one of at least one control device and at least one sensor situated in the vehicle,
- monitoring a plurality of control device functions, a first availability of an auxiliary level, and a second availability of an arrangement for activating the auxiliary level, and
- switching from a steer-by-wire steering to the auxiliary level upon an occurrence of an error in the steer-by-wire steering;

wherein:
- the steer-by-wire steering system is constructed redundantly,
- the control device includes at least one of at least one microcomputer and at least one monitoring module,
- the at least one microcomputer assumes a plurality of tasks of a first logic level, a second logic level, and a third logic level, and
- the at least one monitoring module assumes a plurality of tasks of a fourth logic level.

25. The steer-by-wire steering system according to claim 24, further comprising a dedicated power electronics device for triggering the feedback actuator and the steering actuator.

* * * * *

UNITED STATES PATENT AND TRADEMARK OFFICE
CERTIFICATE OF CORRECTION

PATENT NO. : 6,871,127 B2
DATED : March 22, 2005
INVENTOR(S) : Peter Dominke et al.

It is certified that error appears in the above-identified patent and that said Letters Patent is hereby corrected as shown below:

Column 7,
Line 7, change "angle δhd vor" to -- angle $\delta_v$ or --
Line 10, change "signals UH" to -- signals $U_H$ --

Column 9,
Line 16, change "feedback actuator" to -- feedback actuator LRM --

Column 14,
Line 46, change "a plurals of" to -- a plurality of --

Column 16,
Line 27, change "functions a first" to -- functions, a first --
Line 49, change "a steering, mechanism;" to -- a steering mechanism --

Column 18,
Line 20, change "dissimilar algorithm." to -- dissimilar algorithms. --

Column 20,
Line 50, change "according to claim wherein:" to -- according to claim 21, wherein: --

Signed and Sealed this

Ninth Day of August, 2005

JON W. DUDAS
*Director of the United States Patent and Trademark Office*